(12) United States Patent
Li et al.

(10) Patent No.: US 11,770,833 B2
(45) Date of Patent: Sep. 26, 2023

(54) COMMUNICATION METHOD, TERMINAL DEVICE, AND NETWORK DEVICE

(71) Applicant: HUAWEI TECHNOLOGIES CO., LTD., Guangdong (CN)

(72) Inventors: Chaojun Li, Beijing (CN); Yan Cheng, Beijing (CN); Ruixiang Ma, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 616 days.

(21) Appl. No.: 16/786,738

(22) Filed: Feb. 10, 2020

(65) Prior Publication Data
US 2020/0178233 A1    Jun. 4, 2020

Related U.S. Application Data

(63) Continuation of application No. PCT/CN2017/097130, filed on Aug. 11, 2017.

(51) Int. Cl.
*H04W 72/23* (2023.01)
*H04L 5/00* (2006.01)
(Continued)

(52) U.S. Cl.
CPC .......... *H04W 72/23* (2023.01); *H04L 5/0053* (2013.01); *H04W 72/0453* (2013.01); *H04W 72/1273* (2013.01)

(58) Field of Classification Search
None
See application file for complete search history.

(56) References Cited

U.S. PATENT DOCUMENTS

2013/0044693 A1   2/2013 Lindh et al.
2014/0133365 A1*  5/2014 Peng .................. H04L 5/0092
                                                    370/278
(Continued)

FOREIGN PATENT DOCUMENTS

CN    101132229 A    2/2008
CN    101909356 A    12/2010
(Continued)

OTHER PUBLICATIONS

Huawei, HiSilicon, Superposed transmission of pre-emption indication with eMBB data, 3GPP TSG RAN WG1 NR Ad Hoc Meeting, Qingdao, China, Jun. 27-30, 2017, R1-1711428, 4 pages.
(Continued)

*Primary Examiner* — Srinivasa R Reddivalam
(74) *Attorney, Agent, or Firm* — WOMBLE BOND DICKINSON (US) LLP

(57) ABSTRACT

This application provides a communication method, a terminal device, and a network device. The method performed by a terminal device includes: determining N resource areas, where N is a positive integer; detecting, downlink scheduling information in M resource areas, where the downlink scheduling information includes resource indication information of P resource areas; and determining based on the resource indication information of the P resource areas, a resource for transmitting downlink data, where the M resource areas are M of the N resource areas, the P resource areas are P of the N resource areas, M is a positive integer less than or equal to N, and P is a positive integer less than or equal to N.

20 Claims, 10 Drawing Sheets

(51) Int. Cl.
*H04W 72/0453* (2023.01)
*H04W 72/1273* (2023.01)

(56) References Cited

U.S. PATENT DOCUMENTS

| | | | |
|---|---|---|---|
| 2015/0327226 A1* | 11/2015 | Cheng | H04W 72/042 370/329 |
| 2017/0026938 A1 | 1/2017 | Onggosanusi et al. | |
| 2017/0230994 A1 | 8/2017 | You et al. | |
| 2018/0220400 A1* | 8/2018 | Nogami | H04L 5/0053 |
| 2018/0262311 A1* | 9/2018 | Wang | H04L 5/0044 |
| 2018/0324789 A1* | 11/2018 | Park | H04W 72/0413 |

FOREIGN PATENT DOCUMENTS

| | | |
|---|---|---|
| CN | 103220796 A | 7/2013 |
| CN | 103224796 A | 7/2013 |
| CN | 106941723 A | 7/2017 |

OTHER PUBLICATIONS

LG Electronics, Discussion on pre-emption indication fordownlink, 3GPP TSG RAN WG1 NR Ad-Hoc#2, Qingdao, P.R. China , Jun. 27-30, 2017, R1-1710336, 4 pages.

NTT Docomo et al: "On DL dynamic multiplexing of eMBB and URLLC",3GPP Draft; R1-1705753, Apr. 2, 2017 (Apr. 2, 2017), XP051243868,,total 4 pages.

Nortel Networks, "Support of Wider Bandwidth for LTE-Advanced",TSG-RAN1 #55 R1-084474, Nov. 10-14, 2008, Prague, Czech,total 10 pages.

Qualcomm Incorporated: "URLLC DL pre-emption and UL suspension indication channel design",3GPP Draft; R1-1711554, Jun. 26, 2017 (Jun. 26, 2017), XP051300738, total 9 pages.

CMCC: "Discussion on DCI Contents for NR", 3GPP Draft; R1-1708399, May 14, 2017 (May 14, 2017), XP051273592, total 8 pages.

* cited by examiner

COMMUNICATION METHOD, TERMINAL DEVICE, AND NETWORK DEVICE

CROSS-REFERENCE TO RELATED APPLICATIONS

This application is a continuation of International Application No. PCT/CN2017/097130, filed on Aug. 11, 2017, the disclosure of which is incorporated herein by reference in its entirety.

TECHNICAL FIELD

This application relates to the communications field, and more specifically, to a communication method, a terminal device, and a network device.

BACKGROUND

In a 5G communications system, there are a plurality of different types of services, and different types of services have different transmission requirements. If a resource allocation principle in the prior art is used, some resources may be in an idle state within a period of time, reducing resource usage. For example, for an ultra-reliable and low-latency communications (URLLC) service, to meet a low latency requirement of this type of service, a large quantity of resources need to be reserved to provide a transmission requirement for the URLLC service. However, due to burst of the URLLC service, no data of the URLLC service may need to be sent within a period of time. In this case, the resources reserved for the URLLC service are in an idle state. Therefore, to improve resource utilization, at least some resources originally used to transmit the URLLC service are configured for another terminal device (for example, a first terminal device) for use. In this way, when no data of the URLLC service needs to be transmitted, a network device can send downlink data to the first terminal device by using the at least some resources originally used to transmit the URLLC service.

However, due to the foregoing resource allocation mechanism, resources configured for the first terminal device and resources configured for a terminal device that transmits the URLLC service at least partially overlap. When the URLLC service is to be sent, the foregoing overlapped resources need to be used. However, for the first terminal device, the first terminal device cannot learn whether the foregoing overlapped resources are available to the first terminal device. Therefore, the first terminal device may still receive downlink data or detect downlink control information on the foregoing overlapped resources, increasing complexity and a latency in receiving the downlink data or detecting the downlink control information by the terminal device.

SUMMARY

This application provides a communication method, a terminal device, and a network device, to help reduce a latency in receiving downlink data or detecting downlink control information by a terminal device.

According to a first aspect, this application provides a communication method, including:

determining, by a terminal device, N resource areas, where N is a positive integer;

detecting, by the terminal device, downlink scheduling information in M resource areas, where the downlink scheduling information includes resource indication information of P resource areas; and determining, by the terminal device based on the resource indication information of the P resource areas, a resource for transmitting downlink data, where the M resource areas are M of the N resource areas, the P resource areas are P of the N resource areas, M is a positive integer less than or equal to N, and P is a positive integer less than or equal to N.

In this embodiment of this application, the resource for transmitting the downlink data is indicated to the terminal device by using the downlink scheduling information and the resource indication information of the P resource areas. This helps improve accuracy in determining, by the terminal device, the resource for transmitting the downlink data, to reduce a latency in receiving the downlink data or detecting downlink control information by the terminal device.

In one embodiment, the downlink scheduling information further includes downlink data resource allocation information, and the P resource areas include a first resource area and a second resource area;

the method further includes:

determining, by the terminal device based on resource indication information of the first resource area and resource indication information of the second resource area, that resources available for transmitting the downlink data in the first resource area and resources unavailable for transmitting the downlink data in the second resource area at least partially overlap; and the determining, by the terminal device based on the resource indication information of the P resource areas, a resource for transmitting downlink data includes:

determining, by the terminal device based on the resource indication information of the P resource areas and the downlink data resource allocation information, the resource for transmitting the downlink data, where the resource for transmitting the downlink data includes all or some resources available for transmitting the downlink data in the first resource area.

In one embodiment, resources indicated by the downlink data resource allocation information include some of the resources available for transmitting the downlink data in the first resource area, and the resource for transmitting the downlink data includes the some of the resources available for transmitting the downlink data in the first resource area.

In one embodiment, the P resource areas include a first resource area and a second resource area;

the method further includes:

determining, by the terminal device based on resource indication information of the first resource area and resource indication information of the second resource area, that resources available for transmitting the downlink data in the first resource area and resources unavailable for transmitting the downlink data in the second resource area at least partially overlap; and the determining, by the terminal device based on the resource indication information of the P resource areas, a resource for transmitting downlink data includes:

determining, by the terminal device based on the resource indication information of the P resource areas and the downlink data resource allocation information, the resource for transmitting the downlink data, where the resource for transmitting the downlink data does not include the resources unavailable for transmitting the downlink data in the second resource area.

In one embodiment, the first resource area and the second resource area are two resource areas that belong to the M resource areas; or the first resource area is a resource area that belongs to the M resource areas, and the second resource area is any resource area that does not belong to the M resource areas; or the first resource area is any resource area that does not belong to the M resource areas, and the second resource area is a resource area that belongs to the M resource areas; or the first resource area and the second resource area are any two resource areas that do not belong to the M resource areas.

In one embodiment, the resource indication information of the P resource areas includes P pieces of resource indication information, and the P pieces of resource indication information are in a one-to-one correspondence with the P resource areas; and the P pieces of resource indication information are respectively used to indicate a resource available for transmitting the downlink data or a resource unavailable for transmitting the downlink data in the P resource areas; or the P pieces of resource indication information are respectively used to indicate whether the P resource areas can be used to transmit the downlink data.

In one embodiment, the method further includes:

receiving, by the terminal device, configuration information of the N resource areas, where the configuration information includes first start location information used to indicate a fourth resource area in the M resource areas, the first start location information indicates a start location of a search space at a first aggregation level, and the search space at the first aggregation level is located in the fourth resource area.

In one embodiment, the configuration information further includes second start location information of the fourth resource area in the M resource areas, the second start location information indicates a start location of a search space at a second aggregation level, the search space at the second aggregation level is located in the fourth resource area, and the second aggregation level is different from the first aggregation level.

According to a second aspect, this application provides a communication method. The method includes:

configuring, by a network device, N resource areas for a terminal device, where N is a positive integer; and sending, by the network device, downlink scheduling information to the terminal device in M resource areas, where the downlink scheduling information includes resource indication information of P resource areas, the resource indication information of the P resource areas is used to indicate a resource for transmitting downlink data, the M resource areas are M of the N resource areas, the P resource areas are P of the N resource areas, M is a positive integer less than or equal to N, and P is a positive integer less than or equal to N.

In this embodiment of this application, the resource for transmitting the downlink data is indicated to the terminal device by using the downlink scheduling information and the resource indication information of the P resource areas. This helps improve accuracy in determining, by the terminal device, the resource for transmitting the downlink data, to reduce a latency and calculation complexity in receiving the downlink data or detecting downlink control information by the terminal device.

In one embodiment, the downlink scheduling information further includes downlink data resource allocation information, the P resource areas include a first resource area and a second resource area, resources available for transmitting the downlink data in the first resource area and resources unavailable for transmitting the downlink data in the second resource area at least partially overlap, and the resource for transmitting the downlink data includes all or some resources available for transmitting the downlink data in the first resource area.

In one embodiment, resources indicated by the downlink data resource allocation information include some of the resources available for transmitting the downlink data in the first resource area, and the resource for transmitting the downlink data includes the some of the resources available for transmitting the downlink data in the first resource area.

In one embodiment, the P resource areas include a first resource area and a second resource area, resources available for transmitting the downlink data in the first resource area and resources unavailable for transmitting the downlink data in the second resource area at least partially overlap, and the resource for transmitting the downlink data does not include the resources unavailable for transmitting the downlink data in the second resource area.

In one embodiment, the first resource area and the second resource area are two resource areas that belong to the M resource areas; or the first resource area is a resource area that belongs to the M resource areas, and the second resource area is any resource area that does not belong to the M resource areas; or the first resource area is any resource area that does not belong to the M resource areas, and the second resource area is a resource area that belongs to the M resource areas; or the first resource area and the second resource area are any two resource areas that do not belong to the M resource areas.

In one embodiment, the resource indication information of the P resource areas includes P pieces of resource indication information, and the P pieces of resource indication information are in a one-to-one correspondence with the P resource areas; and the P pieces of resource indication information are respectively used to indicate a resource available for transmitting the downlink data or a resource unavailable for transmitting the downlink data in the P resource areas; or the P pieces of resource indication information are respectively used to indicate whether the P resource areas can be used to transmit the downlink data.

In one embodiment, the method further includes:

sending, by the network device, configuration information of the N resource areas to the terminal device, where the configuration information includes first start location information used to indicate a fourth resource area in the M resource areas, the first start location information indicates a start location of a search space at a first aggregation level, and the search space at the first aggregation level is located in the fourth resource area.

In one embodiment, the configuration information further includes second start location information of the fourth resource area in the M resource areas, the second start location information indicates a start location of a search space at a second aggregation level, the search space at the second aggregation level is located in the fourth resource area, and the second aggregation level is different from the first aggregation level.

According to a third aspect, a terminal device is provided. The terminal device can implement functions of the terminal device in the method designs in the first aspect. These functions may be implemented by hardware, or may be implemented by hardware executing corresponding software. The hardware or the software includes one or more units corresponding to the functions.

According to a fourth aspect, a network device is provided. The network device can implement functions of the network device in the method designs in the second aspect. These functions may be implemented by hardware, or may be implemented by hardware executing corresponding software. The hardware or the software includes one or more units corresponding to the functions.

According to a fifth aspect, a terminal device is provided, including a transceiver, a processor, and a memory. The processor is configured to control the transceiver to send and receive signals. The memory is configured to store a computer program. The processor is configured to invoke the computer program from the memory and run the computer program, so that the terminal device performs the method in the first aspect.

According to a sixth aspect, a network device is provided, including a transceiver, a processor, and a memory. The processor is configured to control the transceiver to send and receive signals. The memory is configured to store a computer program. The processor is configured to invoke the computer program from the memory and run the computer program, so that the network device performs the method in the second aspect.

According to a seventh aspect, a communications apparatus is provided. The communications apparatus may be the terminal device in the foregoing method designs, or may be a chip disposed in the terminal device. The communications apparatus includes: a memory configured to store computer-executable program code, a communications interface, and a processor. The processor is coupled to the memory and the communications interface. The program code stored in the memory includes an instruction. When the processor executes the instruction, the communications apparatus performs the method performed by the terminal device in the first aspect or any possible design of the first aspect.

According to an eighth aspect, a communications apparatus is provided. The communications apparatus may be the network device in the foregoing method designs, or may be a chip disposed in the network device. The communications apparatus includes: a memory configured to store computer-executable program code, a communications interface, and a processor. The processor is coupled to the memory and the communications interface. The program code stored in the memory includes an instruction. When the processor executes the instruction, the communications apparatus performs the method performed by the network device in the second aspect or any possible design of the second aspect.

According to a ninth aspect, a computer program product is provided. The computer program product includes computer program code. When the computer program code runs on a computer, the computer performs the methods in the foregoing aspects.

According to a tenth aspect, a computer-readable medium is provided. The computer-readable medium stores computer program code. When the computer program code runs on a computer, the computer performs the methods in the foregoing aspects.

According to an eleventh aspect, a chip system is provided. The chip system includes a processor that is used by a terminal device to implement functions in the foregoing aspects, for example, generate, receive, send, or process data and/or information in the foregoing methods. In a possible design, the chip system further includes a memory, and the memory is configured to store a program instruction and data that are necessary for the terminal device. The chip system may include a chip, or may include a chip and another discrete device.

According to a twelfth aspect, a chip system is provided. The chip system includes a processor that is configured to support a network device in implementing functions in the foregoing aspects, for example, generate, receive, send, or process data and/or information in the foregoing methods. In a possible design, the chip system further includes a memory, and the memory is configured to store a program instruction and data that are necessary for the network device. The chip system may include a chip, or may include a chip and another discrete device.

DESCRIPTION OF EMBODIMENTS

The following describes technical solutions of this application with reference to accompanying drawings.

Figure 1:
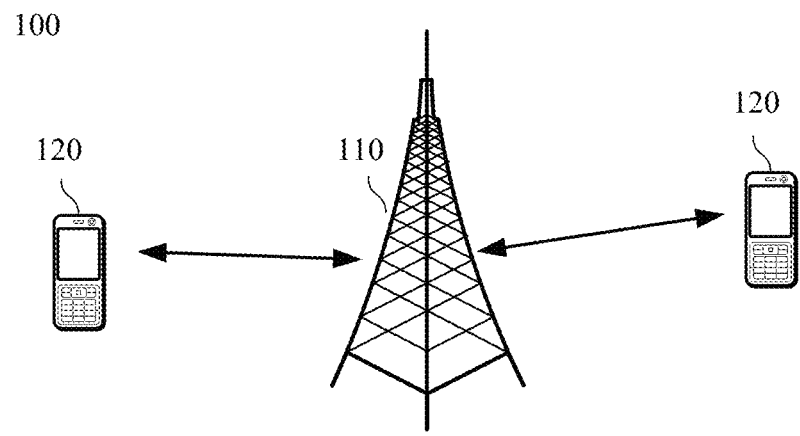
FIG. 1 shows a wireless communications system 100 to which an embodiment of this application is applied.

FIG. 1 shows a wireless communications system 100 to which an embodiment of this application is applied. The wireless communications system 100 may include a network device 110. The network device 110 may be a device communicating with a terminal device. The network device 110 can provide communication coverage for a specific geographical area, and can communicate with a terminal device located in the coverage area.

FIG. 1 shows one network device and two terminals as an example. In one embodiment, the wireless communications system 100 may include a plurality of network devices, and another quantity of terminals may be included in a coverage area of each network device. This is not limited in this embodiment of this application.

In one embodiment, the wireless communications system 100 may further include other network entities such as a network controller and a mobility management entity. This is not limited in this embodiment of this application.

It should be understood that the technical solutions of this application may be applied to various communications systems, such as the global system for mobile communications (GSM), a code division multiple access (CDMA) system, a wideband code division multiple access (WCDMA) system, a general packet radio service (GPRS), a long term evolution (LTE) system, a long term evolution advanced (LTE-A) system, a universal mobile telecommunications system (UMTS), new radio (NR), and 5G.

It should be further understood that, in the embodiments of this application, a terminal device may include but is not limited to a mobile station (MS), a mobile terminal, a mobile phone, user equipment (UE), a handset, portable equipment, and the like. The terminal device may communicate with one or more core networks through a radio access network (RAN). For example, the terminal device may be a mobile phone (or referred to as a "cellular" phone), a computer having a wireless communication function. Alternatively, the terminal device may be a portable, pocket-sized, hand-held, computer built-in, or in-vehicle mobile apparatus.

In the embodiments of this application, a network device may be an access network device, for example, may be a base station, a transmit and receive point (TRP), or an access point. The base station may be a base transceiver station (BTS) in the GSM or CDMA, may be a NodeB in WCDMA, may be an evolved NodeB (eNB or e-NodeB) in LTE, or may be a gNodeB (gNB) in NR or 5G. This is not specifically limited in the embodiments of this application.

For ease of understanding, related concepts in the embodiments of this application are first described briefly.

1. Symbol: A time length of one symbol is not limited in the embodiments of this application. The length of one symbol may vary according to different subcarrier spacings. Symbols may include an uplink symbol and a downlink symbol. The uplink symbol may be referred to as a single carrier frequency division multiple access (SC-FDMA) symbol or an orthogonal frequency division multiplexing (OFDM) symbol. The downlink symbol may be referred to as an OFDM symbol.

It should be noted that the foregoing symbol may alternatively be corresponding to other uplink multiple access manners or downlink multiple access manners. This is not specifically limited in the embodiments of this application.

2. Downlink control channel (PDCCH): The PDCCH is a channel used to carry downlink control information. The downlink control channel in the embodiments of this application may be an sPDCCH, an NR-PDCCH, or another channel that is newly defined in a future communications protocol and that has a similar function to the downlink control channel. The sPDCCH (short PDCCH or shortened PDCCH) is a downlink control channel occupying a time domain resource that is less than or equal to 0.5 ms. The NR-PDCCH (new radio PDCCH) is a downlink control channel defined in an NR system. A type and a name of the downlink control channel are not limited in the embodiments of this application, and all downlink control channels are collectively referred to as PDCCHs. One downlink control channel is obtained by aggregating L downlink control channel elements (CCE), and L is a positive integer.

3. Search space: The search space is a set of candidate downlink control channels, and may be understood as a set that is obtained by combining one or more candidate downlink control channels. Each candidate downlink control channel can be used to carry downlink control information. A terminal device needs to listen on a candidate downlink control channel. Therefore, the search space is a set of candidate downlink control channels that the terminal device listens on.

A network device may configure a first control-resource area for a first terminal device, and configure a second control-resource area for a second terminal device. In this case, for the first terminal device, the first terminal device cannot learn the second control-resource area, and the network device does not send downlink control information to the first terminal device by using the second control-resource area. Correspondingly, the network device does not send downlink data to the first terminal device by using a resource that is used to transmit data and that is corresponding to the second control-resource area. Therefore, the foregoing resource configuration mechanism imposes a limitation that the first terminal device can obtain downlink control information only by using the first control-resource area, and receive downlink data on a resource (that is, a resource that is used to transmit the downlink data and that is corresponding to the first control-resource area) indicated by the downlink control information. In other words, the foregoing resource configuration mechanism limits a resource used by the first terminal device to receive the downlink data.

When the second terminal device is a terminal device that transmits a URLLC service, to meet a low latency requirement of the URLLC service, a large quantity of resources need to be reserved for the URLLC service, so that a to-be-sent URLLC service can be transmitted in a timely manner by using the reserved resources. However, due to burst of the URLLC service, no URLLC service may need to be transmitted within a period of time. In other words, during this period of time, the reserved resources are in an idle state. In this resource configuration mechanism, a large quantity of resources is likely to be idle, resulting in a waste of resources.

To improve resource utilization, the network device may allocate, to both the first terminal device and the second terminal device, at least some resources originally used to transmit the URLLC service. In this way, when the second terminal device has no to-be-transmitted URLLC service, the network device may communicate with the first terminal device by using the resources originally used to transmit the URLLC service, for example, send downlink control information to the first terminal device, to further indicate that downlink data can be used on the resources used to transmit the URLLC service. When the second terminal device needs to transmit a to-be-transmitted URLLC service, the network device may no longer communicate with the first terminal device by using the resources originally used to transmit the URLLC service. However, the first terminal device cannot learn whether the resources originally used to transmit the URLLC service are available to the first terminal device. Therefore, the first terminal device may still receive downlink data or detect downlink control information on the foregoing overlapped resources. This increases calculation complexity in receiving the downlink data or detecting the downlink control information by the terminal device, and further increases a latency.

To resolve the foregoing problem, this application provides a communication method. The following describes in detail the communication method in the embodiments of this application with reference to FIG. 2. It should be noted that the terminal device below may be the first terminal device above.

Figure 2:
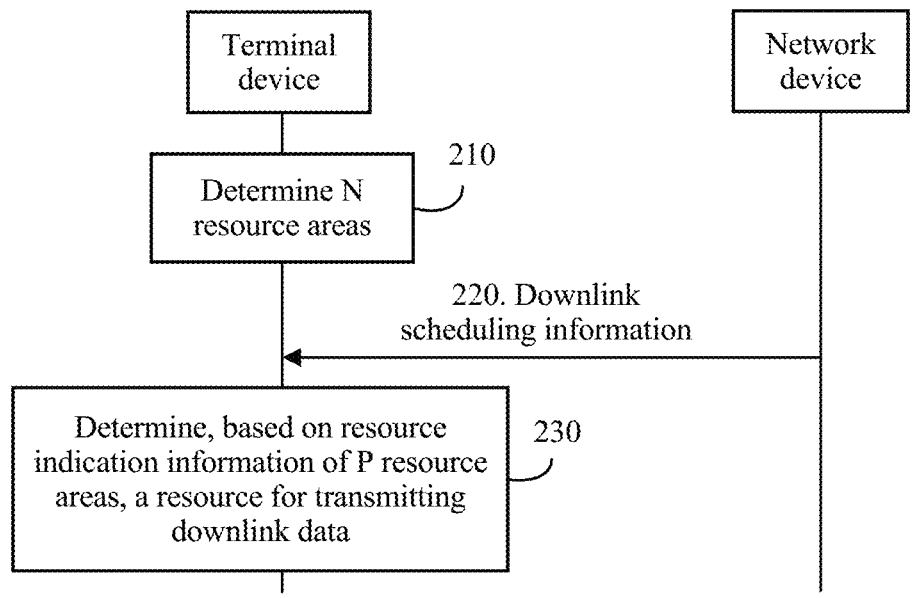
FIG. 2 is a schematic flowchart of a communication method according to an embodiment of this application.

FIG. 2 is a schematic flowchart of a communication method according to an embodiment of this application. The method shown in FIG. 2 includes the following operations.

Operation 210. A terminal device determines N resource areas, where N is a positive integer.

Specifically, the N resource areas may be all resource areas configured by a network device for the terminal device.

Operation 220. The terminal device detects downlink scheduling information in M resource areas, where the downlink scheduling information includes resource indication information of P resource areas.

Specifically, the downlink scheduling information is used to schedule downlink data transmission, and the downlink scheduling information is carried in one or more downlink control channels in the M resource areas. Downlink data is carried in a physical downlink shared channel (PDSCH). If a time domain resource occupied by the PDSCH is less than or equal to 0.5 ms, the PDSCH may also be referred to as an sPDSCH (shortened PDSCH). In a 5G NR system, the PDSCH may also be referred to as an NR-PDSCH (new radio PDSCH). A name of the PDSCH is not limited in this embodiment of this application.

Correspondingly, the network device sends the downlink scheduling information to the terminal device in the M resource areas. The downlink scheduling information includes the resource indication information of the P resource areas, the resource indication information of the P resource areas is used to indicate a resource for transmitting downlink data, the M resource areas are M of the N resource areas, the P resource areas are P of the N resource areas, M is a positive integer less than or equal to N, and P is a positive integer less than or equal to N.

It should be noted that, with reference to the scenario described above, regardless of whether the network device configures, for the terminal device, a resource originally configured for another terminal device (for example, a resource used by a second terminal device to transmit a URLLC service or a control resource used by the second terminal device to transmit downlink control information), resource areas in which the terminal device detects the downlink scheduling information may be merely the M resource areas. In other words, more resources used to transmit data can be configured for the terminal device, but no additional PDCCH blind detection of the terminal device is introduced.

In one embodiment, the resource indication information of the P resource areas includes P pieces of resource indication information, and the P pieces of resource indication information are in a one-to-one correspondence with the P resource areas. The P pieces of resource indication information are respectively used to indicate a resource available for transmitting the downlink data or a resource unavailable for transmitting the downlink data in the P resource areas; or the P pieces of resource indication information are respectively used to indicate whether the P resource areas can be used to transmit the downlink data.

The resource indication information can be used to indicate a usage status of a resource in a resource area corresponding to the resource indication information, and specifically, the following five different usages may be obtained through classification. For ease of description, $i^{th}$ resource indication information in the P pieces of resource indication information is used below for description, and a resource area corresponding to the $i^{th}$ resource indication information is referred to as an $i^{th}$ resource area.

Usage 1: The $i^{th}$ resource indication information is used to indicate a resource unavailable for transmitting the downlink data in the $i^{th}$ resource area, in other words, a resource that cannot be mapped to a PDSCH in the $i^{th}$ resource area.

It should be understood that the resource unavailable for transmitting the downlink data may be a resource occupied by another terminal device, for example, a resource used to transmit downlink data or downlink control information of the another terminal device. Alternatively, the resource unavailable for transmitting the downlink data may be a resource used to transmit downlink control information of the terminal device.

In one embodiment, the resource unavailable for transmitting the downlink data in the $i^{th}$ resource area includes a resource occupied by a downlink control channel in the $i^{th}$ resource area.

It should be noted that the resource unavailable for transmitting the downlink data may be equal to or greater than the resource occupied by the downlink control channel. For example, to reduce a quantity of bits used for the resource indication information, a granularity of a resource indicated by the resource indication information may be insufficiently fine. Consequently, the resource that is unavailable for transmitting the downlink data and that is indicated by the resource indication information is greater than the resource occupied by the downlink control channel.

Preferably, to reduce a waste of resources, the resource that is unavailable for transmitting the downlink data and that is indicated by the $i^{th}$ resource indication information should be as equal as possible to or slightly greater than the resource occupied by the downlink control channel. Therefore, "the resource unavailable for transmitting the downlink data" may also be referred to as "the resource occupied by the downlink control channel".

Usage 2: The $i^{th}$ resource indication information is used to indicate a resource available for transmitting the downlink data in the $i^{th}$ resource area, in other words, a resource that can be mapped to a PDSCH in the $i^{th}$ resource area.

Preferably, to reduce a waste of resources, the resource that is available for transmitting the downlink data and that is indicated by the $i^{th}$ resource indication information should be as equal as possible to or slightly less than a resource that is not occupied by a downlink control channel. Therefore, the resource available for transmitting the downlink data may also be understood as the resource that is not occupied by the downlink control channel.

Usage 3: The $i^{th}$ resource indication information is used to indicate whether the $i^{th}$ resource area can be used to transmit the downlink data, in other words, whether the $i^{th}$ resource area can be mapped to a PDSCH.

For example, the $i^{th}$ resource indication information occupies 1 bit. When a value of the bit is A, the $i^{th}$ resource indication information indicates that the $i^{th}$ resource area can be used to transmit the downlink data. When a value of the bit is B, the $i^{th}$ resource indication information indicates that the $i^{th}$ resource area cannot be used to transmit the downlink data. A represents "1" in binary and B represents "0" in binary. Alternatively, B represents "1" in binary and A represents "0" in binary.

Usage 4: The $i^{th}$ resource indication information is used to indicate whether a resource occupied for transmitting the downlink data includes a resource in the $i^{th}$ resource area, in other words, whether a resource mapped to a PDSCH includes the resource in the $i^{th}$ resource area.

For example, when the $i^{th}$ resource indication information occupies 1 bit, when a value of the bit is A, the $i^{th}$ resource indication information may indicate that the resource occupied for transmitting the downlink data includes the resource in the $i^{th}$ resource area; or when a value of the bit is B, the resource indication information of the $i^{th}$ resource area indicates that the resource occupied for transmitting the downlink data does not include the resource in the $i^{th}$ resource area. A represents "1" in binary and B represents "0" in binary. Alternatively, B represents "1" in binary and A represents "0" in binary.

Usage 5: The $i^{th}$ resource indication information is used to indicate whether a resource in the $i^{th}$ resource area is used only for downlink control channel transmission.

For example, the resource indication information of the $i^{th}$ resource area occupies 1 bit. When a value of the bit is A, the $i^{th}$ resource indication information indicates that the $i^{th}$ resource area can be further used to transmit the downlink data. When a value of the bit is B, the $i^{th}$ resource indication information indicates that the resource in the $i^{th}$ resource area is used only for downlink control channel transmission. A is "1" in binary and B is "0" in binary. Alternatively, B is "1" in binary and A is "0" in binary.

In Usage 1 and Usage 2 in this embodiment of this application, the granularity of the resource indicated by the resource indication information of the $i^{th}$ resource area is relatively small and is relatively accurate, helping improve resource usage. In Usage 3 to Usage 5, the resource indication information of the $i^{th}$ resource area can occupy fewer bits (for example, 1 bit), to reduce information transmission overheads.

It should be noted that in Usages 3, 4, and 5, although the $i^{th}$ resource indication information indicates that the $i^{th}$ resource area can be used to transmit the downlink data, when the terminal device detects one or more downlink control channels in the $i^{th}$ resource area, resources occupied by the one or more downlink control channels still cannot be released to the downlink data for use, in other words, the resources occupied by the one or more downlink control channels cannot be used to transmit the downlink data.

Operation 230. The terminal device determines, based on the resource indication information of the P resource areas, a resource for transmitting downlink data, where the M resource areas are M of the N resource areas, the P resource areas are P of the N resource areas, M is a positive integer less than or equal to N, and P is a positive integer less than or equal to N.

Specifically, the resource for transmitting the downlink data may be a resource actually used to transmit the downlink data, and the resource may be a time domain resource and/or a frequency domain resource.

In this embodiment of this application, the resource for transmitting the downlink data is indicated to the terminal device by using the downlink scheduling information and the resource indication information of the P resource areas. This helps improve accuracy in determining, by the terminal device, the resource for transmitting the downlink data, improve downlink resource utilization, and reduce a latency in receiving the downlink data or detecting the downlink control information by the terminal device.

In one embodiment, before that a terminal device determines N resource areas, the method further includes: receiving, by the terminal device, configuration information that is of the N resource areas and that is sent by the network device, where the configuration information of the N resource areas is used to configure the N resource areas for the terminal device.

Specifically, the network device may configure the N resource areas for the terminal device, and send the configuration information of the N resource areas to the terminal device, so that the terminal device determines the N resource areas based on the configuration information of the N resource areas.

Further, after that the terminal device determines, based on the resource indication information of the P resource areas, a resource for transmitting downlink data, the method further includes: receiving, by the terminal device, the downlink data on the resource for transmitting the downlink data.

M is a positive integer less than or equal to N, and the M resource areas are M of the N resource areas. The network device configures at least one search space in each of the M resource areas. Correspondingly, the terminal device needs to perform PDCCH blind detection in one or more search spaces in the M resource areas, and further detect whether there is downlink control information. In addition, there is no search space in (N-M) resource areas obtained after the M resource areas are removed from the N resource areas. That is, the terminal device does not need to perform PDCCH blind detection in the (N-M) resource areas, in other words, the terminal device does not need to monitor a PDCCH in the (N-M) resource areas. The network device also does not send the downlink control information of the terminal device in the (N-M) resource areas.

In one embodiment, the M resource areas each are referred to as a control-resource set, and another name is used for each of the (N-M) resource areas obtained after the M resource areas are removed from the N resource areas. In this case, all or some of the P resource areas may be control-resource sets. Alternatively, all the N resource areas are referred to as control-resource sets. This is not particularly limited in this embodiment of this application. The control-resource set (CORESET) is a set of resources used to transmit downlink control information, and may also be referred to as a control-resource area or a PDCCH resource set. A downlink control channel resource set includes one or more downlink control channel elements, and any downlink control channel in the downlink control channel resource set includes one or more downlink control channel elements in the downlink control channel resource set. A resource occupied by the downlink control channel resource set may be defined by using a time domain resource and a frequency domain resource.

In one embodiment, the P resource areas include a first resource area and a second resource area, and the method includes: determining, by the terminal device based on resource indication information of the first resource area and resource indication information of the second resource area, that resources available for transmitting the downlink data in the first resource area and resources unavailable for transmitting the downlink data in the second resource area at least partially overlap. In other words, the resources that are available for transmitting the downlink data in the first resource area and that are indicated by the resource indication information of the first resource area and the resources that are unavailable for transmitting the downlink data in the second resource area and that are indicated by the resource indication information of the second resource area at least partially overlap.

Specifically, that resources available for transmitting the downlink data in the first resource area and resources unavailable for transmitting the downlink data in the second resource area at least partially overlap may include that the resources available for transmitting the downlink data in the first resource area and the resources unavailable for transmitting the downlink data in the second resource area totally overlap, or the resources available for transmitting the downlink data in the first resource area and the resources unavailable for transmitting the downlink data in the second resource area partially overlap. The resource used to transmit the downlink data is a resource that can be mapped to the PDSCH. The resource unavailable for transmitting the downlink data is a resource that cannot be mapped to the PDSCH. The resources available for transmitting the downlink data in the first resource area may be all of the first resource area, or a part of the first resource area, for example, some control channel elements (CCE), some symbols, some frequency domain resources, or some search-space-occupied resources. The resources unavailable for transmitting the downlink data in the second resource area may be all of the second resource area, or a part of the second resource area.

However, the resources available for transmitting the downlink data in the first resource area and the resources unavailable for transmitting the downlink data in the second resource area may partially overlap, to form an overlapped area. After receiving the downlink scheduling information, the terminal device cannot determine whether the overlapped area can be used to transmit the downlink data. To avoid a downlink data receiving error that is caused by inconsistent processing methods of the terminal device and the network device for the overlapped area, a unified rule needs to be determined between the terminal device and the network device, and both parties follow the unified rule in a subsequent communication process, to reduce a probability that the terminal makes a downlink data receiving error. The unified rule may be any one of rules described below. It should be noted that the method in this embodiment of this application may also be used for a resource confusion problem of more than two resource areas.

Rule 1: An overlapped resource between the resources that are used to transmit the data in the first resource area and the resources unavailable for transmitting the downlink data in the second resource area is a resource available for transmitting the downlink data. In Rule 1, for the overlapped resource, the downlink data is preferentially transmitted on the overlapped resource. That is, a priority of an available resource is higher. This is particularly applicable to a case in which the unavailable resources in the second resource area include the resources available for transmitting the downlink data in the first resource area, or a case in which the resources available for transmitting the downlink data in the first resource area and the unavailable resources in the second resource area overlap.

Rule 2: The downlink data is not transmitted on an overlapped resource between the resources that are used to transmit the data in the first resource area and the resources unavailable for transmitting the downlink data in the second resource area. In Rule 2, the overlapped resource is not used to transmit the downlink data. For example, downlink control information used to schedule another terminal device, or downlink data (for example, URLLC service data) can be preferentially transmitted on the overlapped resource. That is, a priority of an unavailable resource is higher. This is particularly applicable to a case in which the resources available for transmitting the downlink data in the first resource area include the unavailable resources in the second resource area, or a case in which the resources available for transmitting the downlink data in the first resource area and the unavailable resources in the second resource area overlap.

Rule 3: If the resources available for transmitting the downlink data in the first resource area and the resources unavailable for transmitting the downlink data in the second resource area partially overlap, the terminal device determines that the downlink scheduling information is error information, and does not receive the downlink data based on the downlink scheduling information. If Rule 3 is used, the network device needs to avoid this confusion as much as possible through proper scheduling.

The downlink scheduling information further includes downlink data resource allocation information. That is, the downlink scheduling information includes the downlink data resource allocation information and the resource indication information of the P resource areas. The downlink data resource allocation information indicates a resource occupied by the downlink data. The resource occupied by the downlink data may be considered as an initial resource of the downlink data, and finally, a resource for actually transmitting the downlink data is further determined in combination with the resource indication information of the P resource areas. The downlink data resource allocation information includes downlink data time domain resource information and/or downlink data frequency domain resource information. It should be noted that the downlink data resource allocation information and the resource indication information of the P resource areas may be jointly used for indication or separately used for indication. This is not limited in this embodiment of this application.

It should be further understood that the downlink data resource allocation information may be resource allocation information in an existing communications system, or may be newly defined information. This is not specifically limited in this embodiment of this application.

According to Rule 1, that the terminal device determines, based on the resource indication information of the P resource areas, a resource for transmitting downlink data may specifically include: The terminal device determines, based on the resource indication information of the P resource areas and the downlink data resource allocation information, the resource for transmitting the downlink data, where the resource for transmitting the downlink data includes all or some resources available for transmitting the downlink data in the first resource area.

For ease of description, finally determined resources used to transmit the downlink data are denoted as resources A, resources indicated by the downlink data resource allocation information are denoted as resources B, the resources available for transmitting the downlink data in the first resource area are denoted as resources C, and the resources unavailable for transmitting the downlink data in the second resource area are denoted as resources D.

In one embodiment, the resources indicated by the downlink data resource allocation information include some of the resources available for transmitting the downlink data in the first resource area, and the resource for transmitting the downlink data includes the some of the resources available for transmitting the downlink data in the first resource area.

Specifically, frequency domain resources and/or time domain resources of the resources A fall only within frequency domain resources and/or time domain resources of the resources B. If a frequency domain resource and/or a time domain resource of the resources C fall/falls outside the frequency domain resources and/or the time domain resources of the resources B, the frequency domain resource and/or the time domain resource of the resources C that fall/falls outside the resources B cannot be released to the downlink data for use. Therefore, the resource for transmitting the downlink data includes some of the resources available for transmitting the downlink data in the first resource area.

In one embodiment, the frequency domain resources and/or the time domain resources of the resources B include all frequency domain resources and/or all time domain resources of the resources C. Therefore, the resource for transmitting the downlink data includes all the resources available for transmitting the downlink data in the first resource area.

In one embodiment, the frequency domain resources and/or the time domain resources of the resources A may include all frequency domain resources and/or all time domain resources of the resources C. In other words, the frequency domain resources and/or the time frequency resources of the resources A may exceed a range of the frequency domain resources and/or the time domain resources of the resources B. Therefore, the resource for transmitting the downlink data includes all the resources available for transmitting the downlink data in the first resource area.

Specifically, the resources that are used to transmit the downlink data and that are indicated by the downlink data resource allocation information and the resources available for transmitting the downlink data in the first resource area partially overlap, and that the resource for transmitting the downlink data includes some resources available for transmitting the downlink data in the first resource area may include that the resource for transmitting the downlink data includes an overlapped resource between the resources that are used to transmit the downlink data and that are indicated by the downlink data resource allocation information and the resources available for transmitting the downlink data in the first resource area.

According to Rule 2, that the terminal device determines, based on the resource indication information of the P resource areas, a resource for transmitting downlink data may specifically include: The terminal device determines, based on the resource indication information of the P resource areas and the downlink data resource allocation information, the resource for transmitting the downlink data, where the resource for transmitting the downlink data does not include the resources unavailable for transmitting the downlink data in the second resource area.

According to Rule 3, that the terminal device determines, based on the resource indication information of the P resource areas, a resource for transmitting downlink data may specifically include: The terminal device determines, based on a case that is indicated by the resource indication information of the P resource areas and in which the resources available for transmitting the downlink data in the first resource area and the resources unavailable for transmitting the downlink data in the second resource area at least partially overlap, that the downlink scheduling information is the error information, and does not receive the downlink data based on the downlink scheduling information. That is, there is no resource for transmitting the downlink data. Therefore, the terminal device does not need to receive the downlink data.

In one embodiment, the terminal device receives rule configuration information, and the rule configuration information indicates that Rule 1, Rule 2, or Rule 3 is used. Then, the terminal device determines a currently used rule based on the rule configuration information. Correspondingly, the network device determines the currently used rule and sends the rule configuration information.

In one embodiment, a used rule is determined based on at least one of the following: Rule 1 or Rule 2 is used if the resources C and the resources D partially overlap; or Rule 2 is used if the resources C include the resources D; or Rule 1 is used if the resources D include the resources C.

That is, the resources available for transmitting the downlink data may be resources that can be used to transmit the downlink data. However, it does not indicate that the downlink data is finally transmitted on the resources available for transmitting the downlink data. The resources unavailable for transmitting the downlink data may be resources that cannot be used to transmit the downlink data and that are indicated by the network device. However, finally, according to the rules in this embodiment of this application, the downlink data can also be transmitted on the resources unavailable for transmitting the downlink data.

Figure 3:
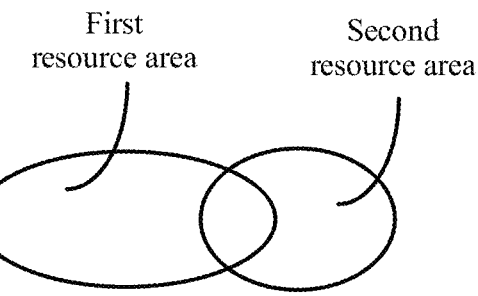
FIG. 3 is a schematic diagram of a relative location relationship of at least partially overlap between a first resource area and a second resource area according to an embodiment of this application.
Figure 4:
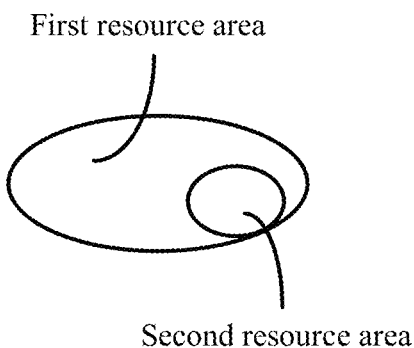
FIG. 4 is a schematic diagram of a relative location relationship of at least partially overlap between a first resource area and a second resource area according to an embodiment of this application.
Figure 5:
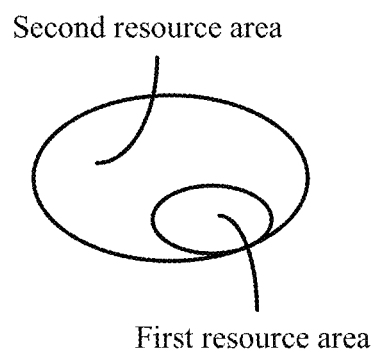
FIG. 5 is a schematic diagram of a relative location relationship of at least partially overlap between a first resource area and a second resource area according to an embodiment of this application.
Figure 6:
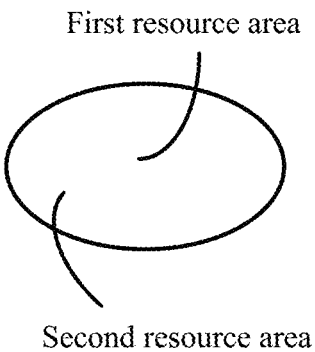
FIG. 6 is a schematic diagram of a relative location relationship of at least partially overlap between a first resource area and a second resource area according to an embodiment of this application.

For example, FIG. 3 to FIG. 6 are schematic diagrams of a relative location relationship of at least partially overlap between a first resource area and a second resource area in this embodiment of this application. FIG. 3 shows a case in which resources in the first resource area and resources in the second resource area partially overlap in this embodiment of this application. FIG. 4 shows a case in which the first resource area includes the second resource area in this embodiment of this application. FIG. 5 shows a case in which the second resource area includes the first resource area in this embodiment of this application. FIG. 6 shows a case in which the first resource area and the second resource area totally overlap in this embodiment of this application.

The P resource areas may be totally the same as, or partially the same as, or totally different from the M resource areas. For example, the P resource areas include the first resource area and the second resource area, and the M resource areas include the first resource area and a third resource area. This is a case in which the P resource areas are partially the same as the M resource areas. In one embodiment, P is equal to N, that is, the resource indication information indicates resource usage statuses of the N resource areas. In one embodiment, P is less than N, and in this case, resources in (N-P) resource areas cannot be released to the downlink data (that is, the PDSCH) for use.

In one embodiment, the first resource area and the second resource area are two resource areas that belong to the M resource areas; or the first resource area is a resource area that belongs to the M resource areas, and the second resource area is any resource area that does not belong to the M resource areas; or the first resource area is any resource area that does not belong to the M resource areas, and the second resource area is a resource area that belongs to the M resource areas; or the first resource area and the second resource area are any two resource areas that do not belong to the M resource areas.

In one embodiment, the method further includes:
receiving, by the terminal device, configuration information that is of the N resource areas and that is sent by the network device, where the configuration information of the N resource areas is used to configure the N resource areas for the terminal device.

Correspondingly, the network device configures the N resource areas for the terminal device, where N is a positive integer; and the network device sends the configuration information of the N resource areas to the terminal device, where the configuration information of the N resources areas is used to configure the N resource areas for the terminal device.

In one embodiment, the N resource areas include a fifth resource area, the configuration information of the N resource areas includes configuration information of the fifth resource area, and the configuration information of the fifth resource area is used to indicate a time domain resource and/or a frequency domain resource of the fifth resource area.

In one embodiment, search space configuration information of the fifth resource area includes search space quantity indication information of the fifth resource area, and the search space quantity indication information indicates whether the fifth resource area includes a search space; or the search space quantity indication information indicates that the fifth resource area includes S search spaces, where S is an integer.

In one embodiment, the search space configuration information of the fifth resource area further includes aggregation level indication information, and the aggregation level indication information is used to indicate a set level of a search space in the fifth resource area.

For example, the network device indicates, to the terminal device by using the aggregation level indication information, that there are search spaces at aggregation levels L1 and L2 in the fifth resource area.

In one embodiment, the fifth resource area is one of the M resource areas, and the configuration information of the fifth resource area includes the search space configuration information of the fifth resource area.

In one embodiment, the fifth resource area is a resource area, other than the M resource areas, in the N resource areas, and the configuration information of the fifth resource area is used to achieve a configuration that the terminal device does not perform PDCCH blind detection in the fifth resource area, or a quantity of search spaces in the fifth resource area is 0, or there is no search space in the fifth resource area.

It should be noted that, the configuration information of the fifth resource area does not include the search space configuration information of the fifth resource area; or the configuration information of the fifth resource area includes the search space configuration information of the fifth resource area, and the search space configuration information of the fifth resource area indicates that the quantity of search spaces in the fifth resource area is 0; or the configuration information of the fifth resource area includes the search space configuration information of the fifth resource area, and the search space configuration information of the fifth resource area indicates that there is no search space in the fifth resource area.

In one embodiment, the configuration method for the fifth resource area may also be used for the first resource area and/or the second resource area. Because content is the same, the fifth resource area only needs to be replaced with the first resource area or the second resource area. Details are not described herein again.

In one embodiment, the method further includes: receiving, by the terminal device, configuration information of the N resource areas, where the configuration information includes first start location information used to indicate a fourth resource area in the M resource areas, the first start location information indicates a start location of a search space at a first aggregation level, and the search space at the first aggregation level is located in the fourth resource area.

In one embodiment, the configuration information further includes second start location information of the fourth resource area in the M resource areas, the second start location information indicates a start location of a search space at a second aggregation level, the search space at the second aggregation level is located in the fourth resource area, and the second aggregation level is different from the first aggregation level.

It should be understood that the start location of the search space at the first aggregation level may be the same as or different from the start location of the search space at the second aggregation level. If the start location of the search space at the first aggregation level is the same as the start location of the search space at the second aggregation level, a channel estimation result corresponding to the search spaces at the two different aggregation levels may be shared, to reduce implementation complexity of the terminal device. If the start location of the search space at the first aggregation level is different from the start location of the search space at the second aggregation level, an overlapped area between the search spaces at the two different aggregation levels may be reduced, to help reduce a PDCCH collision probability.

In this embodiment of this application, the start location of the search space at the first aggregation level is configured to be the same as the start location of the search space at the second aggregation level, to share the channel estimation result corresponding to the search spaces at the two different aggregation levels. This helps reduce the implementation complexity of the terminal device. When the start location of the search space at the first aggregation level is different from the start location of the search space at the second aggregation level, the overlapped area between the search spaces at the two different aggregation levels may be reduced, to help reduce the PDCCH collision probability. In addition, a probability of a PDCCH collision between different terminal devices may also be reduced through configuration performed by the network device.

In one embodiment, the configuration method for a start location of a search space in the fourth resource area may also be used for the first resource area and/or the second resource area. Because content is the same, the fourth resource area only needs to be replaced with the first/second resource area. Details are not described herein again.

The following describes the communication method in the embodiments of this application with reference to a specific example. It should be understood that for ease of understanding, the following provides descriptions by using an example in which resources available for transmitting downlink data in a first resource area are all resources in the first resource area (denoted as the first resource area) and resources unavailable for transmitting the downlink data in a second resource area are all resources in the second resource area (denoted as the second resource area). However, the embodiments of this application are not limited thereto.

Figure 7:
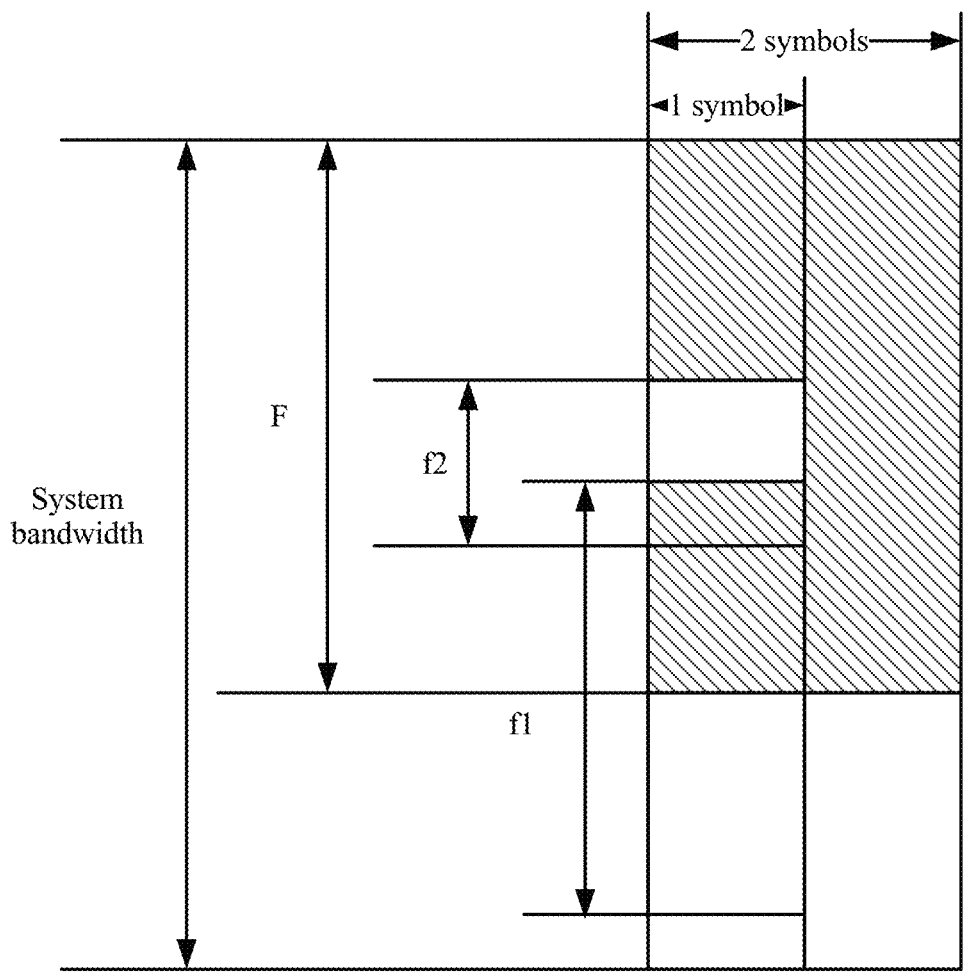
FIG. 7 is a schematic diagram of a resource configuration according to an embodiment of this application.

FIG. 7 is a schematic diagram of a resource configuration according to an embodiment of this application. In a resource configuration solution shown in FIG. 7, resources that are used to transmit downlink data and that are indicated by downlink data resource configuration information occupy two symbols in time domain, and a frequency occupied by the resources in frequency domain is represented by F. A first resource area occupies one symbol in time domain, and a frequency occupied by the first resource area in frequency domain is represented by f1. A second resource area occupies one symbol in time domain, and a frequency occupied by the second resource area in frequency domain is represented by f2. There is an overlapped area between the first resource area and the second resource area, and the resources that are used to transmit the downlink data and that are indicated by the downlink data resource configuration information include only some resources in the first resource area. Therefore, when the downlink data is preferentially transmitted in the overlapped area between the first resource area and the second resource area, with reference to the downlink data resource configuration information, resource indication information of the first resource area, and resource indication information of the second resource area, resources actually occupied for transmitting the downlink data include resources, other than resources that belong only to the second resource area, in the resources that are used to transmit the downlink data and that are indicated by the downlink data resource configuration information, and the resources that belong only to the second resource area are resources, falling outside the overlapped area between the first resource area and the second resource area, in resources included in the second resource area.

Figure 8:
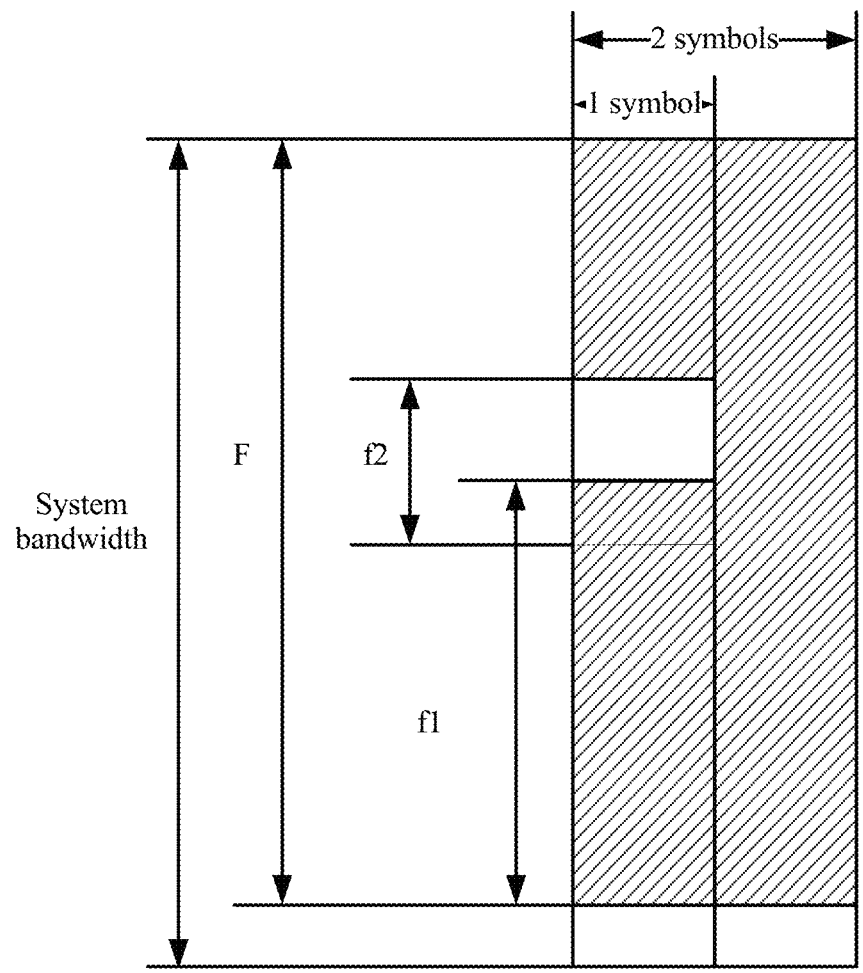
FIG. 8 is a schematic diagram of a resource configuration according to another embodiment of this application.

FIG. 8 is a schematic diagram of a resource configuration according to another embodiment of this application. In a resource configuration solution shown in FIG. 8, resources that are used to transmit downlink data and that are indicated by downlink data resource configuration information occupy two symbols in time domain, and a frequency occupied by the resources in frequency domain is represented by F. A first resource area occupies one symbol in time domain, and a frequency occupied by the first resource area in frequency domain is represented by f1. A second resource area occupies one symbol in time domain, and a frequency occupied by the second resource area in frequency domain is represented by f2. There is an overlapped area between the first resource area and the second resource area, and the resources that are used to transmit the downlink data and that are indicated by the downlink data resource configuration information include all resources in the first resource area. Therefore, when the downlink data is preferentially transmitted in the overlapped area between the first resource area and the second resource area, with reference to the downlink data resource configuration information, resource indication information of the first resource area, and resource indication information of the second resource area, resources actually occupied for transmitting the downlink data include resources, other than resources that belong only to the second resource area, in the resources that are used to transmit the downlink data and that are indicated by the downlink data resource configuration information, and the resources that belong only to the second resource area are resources, falling outside the overlapped area between the first resource area and the second resource area, in resources included in the second resource area.

Figure 9:
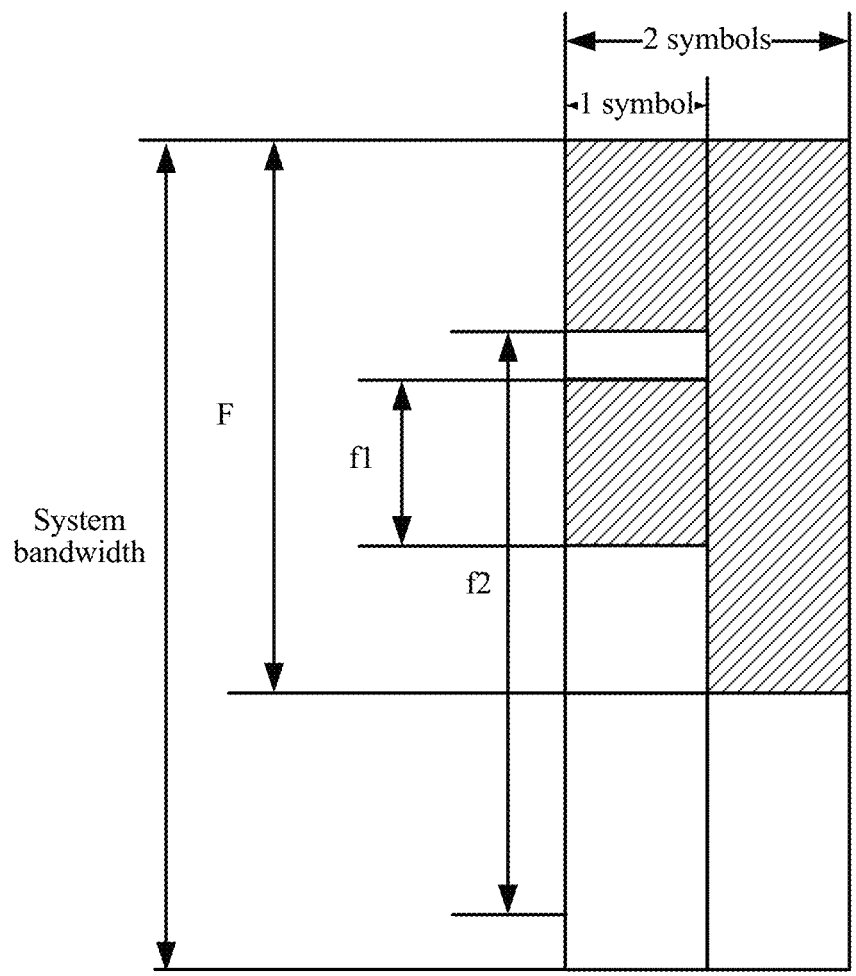
FIG. 9 is a schematic diagram of a resource configuration according to another embodiment of this application.

FIG. 9 is a schematic diagram of a resource configuration according to another embodiment of this application. In a resource configuration solution shown in FIG. 9, resources that are used to transmit downlink data and that are indicated by downlink data resource configuration information occupy two symbols in time domain, and a frequency occupied by the resources in frequency domain is represented by F. A first resource area occupies one symbol in time domain, and a frequency occupied by the first resource area in frequency domain is represented by f1. A second resource area occupies one symbol in time domain, and a frequency occupied by the second resource area in frequency domain is represented by f2. The second resource area includes the first resource area, the resources that are used to transmit the downlink data and that are indicated by the downlink data resource configuration information include all resources in the first resource area, and the resources that are used to transmit the downlink data and that are indicated by the downlink data resource configuration information include some resources in the second resource area. Therefore, when the downlink data is preferentially transmitted in an overlapped area between the first resource area and the second resource area, with reference to the downlink data resource configuration information, resource indication information of the first resource area, and resource indication information of the second resource area, resources actually occupied for transmitting the downlink data include resources, other than resources that belong only to the second resource area, in the resources that are used to transmit the downlink data and that are indicated by the downlink data resource configuration information, and the resources that belong only to the second resource area are resources, falling outside the overlapped area between the first resource area and the second resource area, in resources included in the second resource area. In other words, the resources actually occupied for transmitting the downlink data include all the resources in the first resource area.

Figure 10:
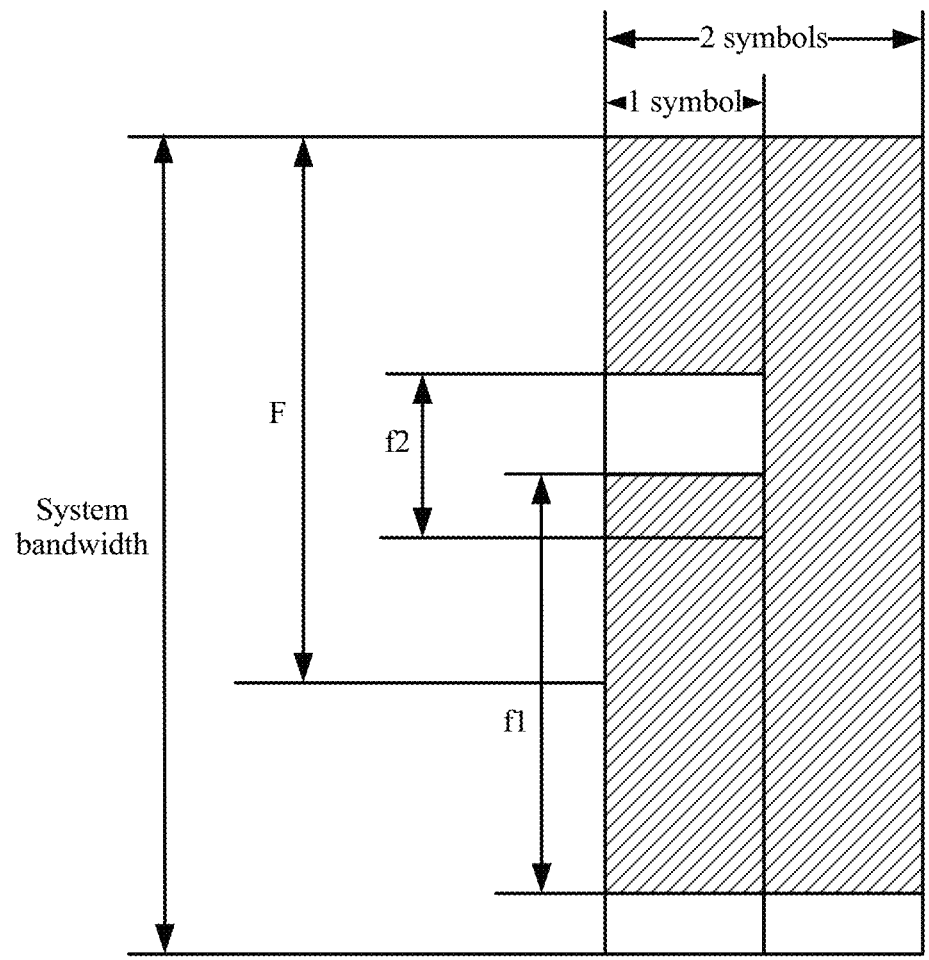
FIG. 10 is a schematic diagram of a resource configuration according to another embodiment of this application.

FIG. 10 is a schematic diagram of a resource configuration according to another embodiment of this application. In a resource configuration solution shown in FIG. 10, resources that are used to transmit downlink data and that are indicated by downlink data resource configuration information occupy two symbols in time domain, and a frequency occupied by the resources in frequency domain is represented by F. A first resource area occupies two symbols in time domain, and a frequency occupied by the first resource area in frequency domain is represented by f1. A second resource area occupies one symbol in time domain, and a frequency occupied by the second resource area in frequency domain is represented by f2. There is an overlapped area between the first resource area and the second resource area, and the resources that are used to transmit the downlink data and that are indicated by the downlink data resource configuration information include only some resources in the first resource area. Therefore, when the downlink data is preferentially transmitted in the overlapped area between the first resource area and the second resource area, with reference to the downlink data resource configuration information, resource indication information of the first resource area, and resource indication information of the second resource area, resources actually occupied for transmitting the downlink data include all resources in the first resource area and include resources, other than resources that belong only to the second resource area, in the resources that are used to transmit the downlink data and that are indicated by the downlink data resource configuration information, and the resources that belong only to the second resource area are resources, falling outside the overlapped area between the first resource area and the second resource area, in resources included in the second resource area.

Figure 11:
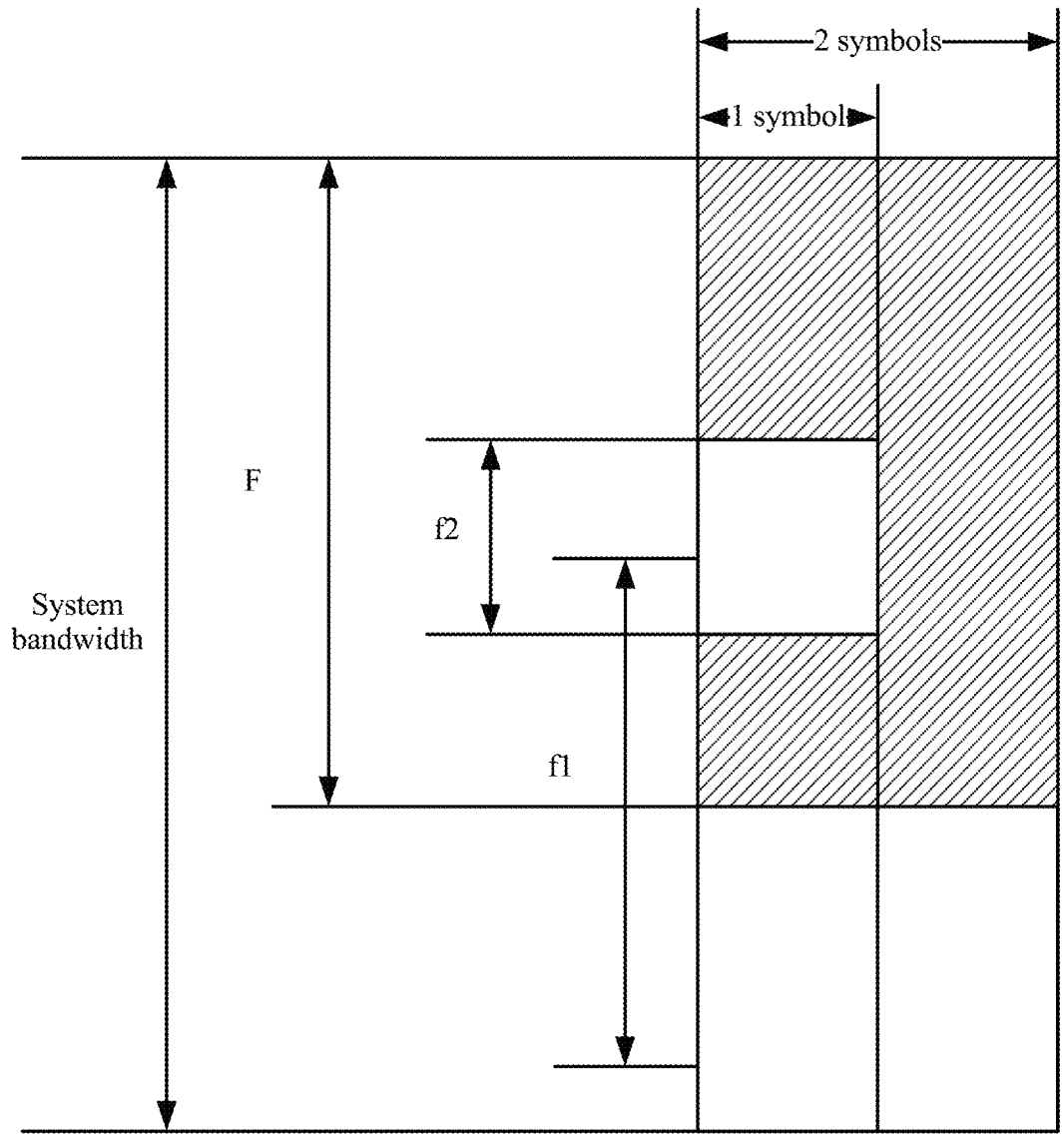
FIG. 11 is a schematic diagram of a resource configuration according to another embodiment of this application.
Figure 12:
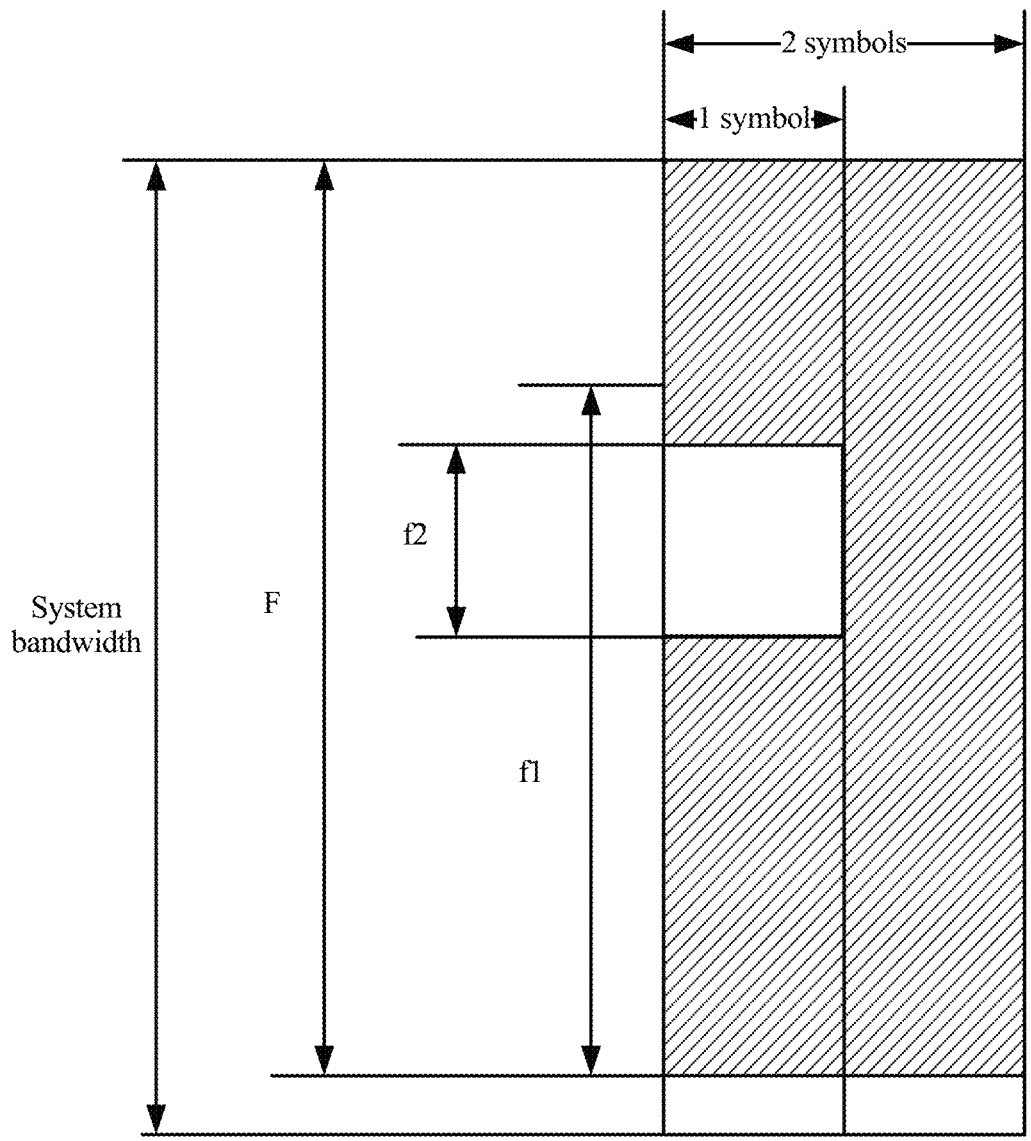
FIG. 12 is a schematic diagram of a resource configuration according to another embodiment of this application.

With reference to FIG. 7 to FIG. 10, the foregoing describes in detail a case in which the downlink data is preferentially transmitted in the overlapped area between the first resource area and the second resource area in the embodiments of this application. With reference to FIG. 11 and FIG. 12, the following describes in detail a case in which a resource in the overlapped area between the first resource area and the second resource area is not used to transmit the downlink data in the embodiments of this application.

FIG. 11 is a schematic diagram of a resource configuration according to another embodiment of this application. In a resource configuration solution shown in FIG. 11, resources that are used to transmit downlink data and that are indicated by downlink data resource configuration information occupy two symbols in time domain, and a frequency occupied by the resources in frequency domain is represented by F. A first resource area occupies one symbol in time domain, and a frequency occupied by the first resource area in frequency domain is represented by f1. A second resource area occupies one symbol in time domain, and a frequency occupied by the second resource area in frequency domain is represented by f2. There is an overlapped area between the first resource area and the second resource area, and the resources that are used to transmit the downlink data and that are indicated by the downlink data resource configuration information include only some resources in the first resource area. Therefore, when a resource in the overlapped area between the first resource area and the second resource area is not used to transmit the downlink data, with reference to the downlink data resource configuration information, resource indication information of the first resource area, and resource indication information of the second resource area, resources actually occupied for transmitting the downlink data include resources, other than resources in the second resource area, in the resources that are used to transmit the downlink data and that are indicated by the downlink data resource configuration information.

FIG. 12 is a schematic diagram of a resource configuration according to another embodiment of this application. In a resource configuration solution shown in FIG. 12, resources that are used to transmit downlink data and that are indicated by downlink data resource configuration information occupy two symbols in time domain, and a frequency occupied by the resources in frequency domain is represented by F. A first resource area occupies one symbol in time domain, and a frequency occupied by the first resource area in frequency domain is represented by f1. A second resource area occupies one symbol in time domain, and a frequency occupied by the second resource area in frequency domain is represented by f2. There is an overlapped area between the first resource area and the second resource area, and the resources that are used to transmit the downlink data and that are indicated by the downlink data resource configuration information include only some resources in the first resource area. Therefore, when a resource in the overlapped area between the first resource area and the second resource area is not used to transmit the downlink data, with reference to the downlink data resource configuration information, resource indication information of the first resource area, and resource indication information of the second resource area, resources actually occupied for transmitting the downlink data include all resources in the first resource area and include resources, other than resources in the second resource area, in the resources that are used to transmit the downlink data and that are indicated by the downlink data resource configuration information.

The foregoing describes in detail the communication method in the embodiments of this application with reference to FIG. 1 to FIG. 12. The following describes in detail apparatuses in the embodiments of this application with reference to FIG. 13 to FIG. 16. It should be understood that the apparatuses shown in FIG. 13 to FIG. 16 can implement the operations in FIG. 2. In other words, the apparatuses can perform all the methods in the foregoing embodiments. Therefore, for specific details of the apparatuses, refer to the descriptions in the foregoing embodiments. To avoid repetition, details are not described herein again.

Figure 13:
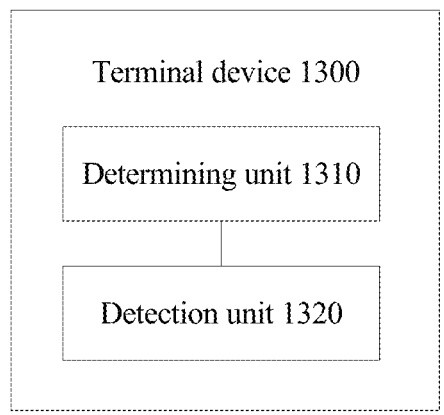
FIG. 13 is a schematic block diagram of a terminal device according to an embodiment of this application.

FIG. 13 is a schematic block diagram of a terminal device 1300 according to an embodiment of this application. The terminal device 1300 shown in FIG. 13 includes a determining unit 1310 and a detection unit 1320.

The determining unit is configured to determine N resource areas, where N is a positive integer.

The detection unit is configured to detect downlink scheduling information in M resource areas, where the downlink scheduling information includes resource indication information of P resource areas.

The determining unit is further configured to determine, based on the resource indication information of the P resource areas, a resource for transmitting downlink data.

The M resource areas are M of the N resource areas, the P resource areas are P of the N resource areas, M is a positive integer less than or equal to N, and P is a positive integer less than or equal to N.

In this embodiment of this application, the resource for transmitting the downlink data is indicated to the terminal device by using the downlink scheduling information and the resource indication information of the P resource areas. This helps improve accuracy in determining, by the terminal device, the resource for transmitting the downlink data, to reduce a latency in receiving the downlink data or detecting downlink control information by the terminal device.

In one embodiment, the downlink scheduling information further includes downlink data resource allocation information, the P resource areas include a first resource area and a second resource area, and the determining unit is further configured to:

determine, based on resource indication information of the first resource area and resource indication information of the second resource area, that resources available for transmitting the downlink data in the first resource area and resources unavailable for transmitting the downlink data in the second resource area at least partially overlap; and determine, based on the resource indication information of the P resource areas and the downlink data resource allocation information, the resource for transmitting the downlink data, where the resource for transmitting the downlink data includes all or some resources available for transmitting the downlink data in the first resource area.

In one embodiment, resources indicated by the downlink data resource allocation information include some of the resources available for transmitting the downlink data in the first resource area, and the resource for transmitting the downlink data includes the some of the resources available for transmitting the downlink data in the first resource area.

In one embodiment, the P resource areas include a first resource area and a second resource area, and the determining unit is further configured to:

determine, based on resource indication information of the first resource area and resource indication information of the second resource area, that resources available for transmitting the downlink data in the first resource area and resources unavailable for transmitting the downlink data in the second resource area at least partially overlap; and determine, based on the resource indication information of the P resource areas and the downlink data resource allocation information, the resource for transmitting the downlink data, where the resource for transmitting the downlink data does not include the resources unavailable for transmitting the downlink data in the second resource area.

In one embodiment, the first resource area and the second resource area are two resource areas that belong to the M resource areas; or the first resource area is a resource area that belongs to the M resource areas, and the second resource area is any resource area that does not belong to the M resource areas; or the first resource area is any resource area that does not belong to the M resource areas, and the second resource area is a resource area that belongs to the M resource areas; or the first resource area and the second resource area are any two resource areas that do not belong to the M resource areas.

In one embodiment, the resource indication information of the P resource areas includes P pieces of resource indication information, and the P pieces of resource indication information are in a one-to-one correspondence with the P resource areas; and the P pieces of resource indication information are respectively used to indicate a resource available for transmitting the downlink data or a resource unavailable for transmitting the downlink data in the P resource areas; or the P pieces of resource indication information are respectively used to indicate whether the P resource areas can be used to transmit the downlink data.

In one embodiment, the terminal device further includes:

a receiving unit, configured to receive configuration information of the N resource areas, where the configuration information includes first start location information used to indicate a fourth resource area in the M resource areas, the first start location information indicates a start location of a search space at a first aggregation level, and the search space at the first aggregation level is located in the fourth resource area.

In one embodiment, the configuration information further includes second start location information of the fourth resource area in the M resource areas, the second start location information indicates a start location of a search space at a second aggregation level, the search space at the second aggregation level is located in the fourth resource area, and the second aggregation level is different from the first aggregation level.

In one embodiment, the determining unit 1310 and the detection unit 1320 may be a processor 1420, and the terminal device may further include a transceiver 1440, an input/output interface 1430, and a memory 1410. Details are shown in FIG. 14.

Figure 14:
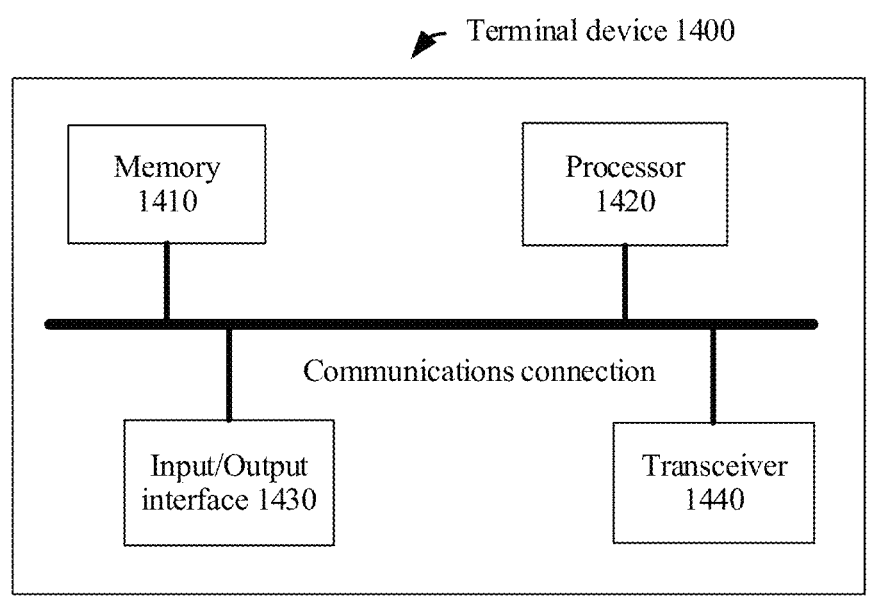
FIG. 14 is a schematic block diagram of a terminal device according to another embodiment of this application.

FIG. 14 is a schematic block diagram of a terminal device 1400 according to another embodiment of this application. The terminal device can perform all the methods in the foregoing embodiments. Therefore, for specific details of the terminal device, refer to the descriptions in the foregoing embodiments. To avoid repetition, details are not described herein again. The terminal device 1400 shown in FIG. 14 may include a memory 1410, a processor 1420, an input/output interface 1430, and a transceiver 1440. The memory 1410, the processor 1420, the input/output interface 1430, and the transceiver 1440 are connected by using internal connecting paths. The memory 1410 is configured to store an instruction. The processor 1420 is configured to execute the instruction stored in the memory 1410, to control the input/output interface 1430 to receive input data and information, or output data such as an operation result, and control the transceiver 1440 to send a signal.

The processor 1420 is configured to determine N resource areas, where N is a positive integer.

The processor 1420 is further configured to detect downlink scheduling information in M resource areas, where the downlink scheduling information includes resource indication information of P resource areas. The processor 1420 is further configured to determine, based on the resource indication information of the P resource areas, a resource for transmitting downlink data, where the M resource areas are M of the N resource areas, the P resource areas are P of the N resource areas, M is a positive integer less than or equal to N, and P is a positive integer less than or equal to N.

It should be understood that, in this embodiment of this application, the processor 1420 may be a general-purpose central processing unit (CPU), a microprocessor, an application-specific integrated circuit (ASIC), or one or more integrated circuits, and is configured to execute a related program, to implement the technical solutions provided in this embodiment of this application.

It should be further understood that the transceiver 1440 is also referred to as a communications interface, and a transceiver apparatus, for example, but not limited to, a transceiver, is used to implement communication between the terminal device 1400 and another device or a communications network.

The memory 1410 may include a read-only memory and a random access memory, and provide an instruction and data for the processor 1420. A part of the memory 1410 may further include a nonvolatile random access memory. For example, memory 1410 may further store device type information.

In an implementation process, the operations in the foregoing method can be implemented by using an integrated logic circuit of hardware in the processor 1420, or by using instructions in a form of software. The communication method disclosed with reference to the embodiments of this application may be directly performed by using a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 1410, and the processor 1420 reads information in the memory 1410 and completes the operations in the foregoing method in combination with hardware in the processor 1420. To avoid repetition, details are not described herein again.

It should be understood that, in this embodiment of this application, the processor may be a central processing unit (CPU), or the processor may be another general-purpose processor, a digital signal processor (DSP), an application-specific integrated circuit (ASIC), a field programmable gate array (FPGA) or another programmable logic device, a discrete gate, a transistor logic device, a discrete hardware component, or the like. The general-purpose processor may be a microprocessor, or the processor may be any conventional processor or the like.

In this embodiment of this application, the resource for transmitting the downlink data is indicated to the terminal device by using the downlink scheduling information and the resource indication information of the P resource areas. This helps improve accuracy in determining, by the terminal device, the resource for transmitting the downlink data, to reduce a latency in receiving the downlink data or detecting downlink control information by the terminal device.

Figure 15:
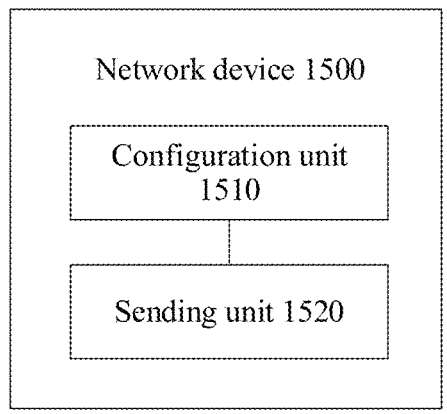
FIG. 15 is a schematic block diagram of a network device according to an embodiment of this application.

FIG. 15 is a schematic block diagram of a network device 1500 according to an embodiment of this application. The network device 1500 shown in FIG. 15 includes a configuration unit 1510 and a sending unit 1520.

The configuration unit is configured to configure N resource areas for a terminal device, where N is a positive integer.

The sending unit is configured to send downlink scheduling information to the terminal device in M resource areas, where the downlink scheduling information includes resource indication information of P resource areas, the resource indication information of the P resource areas is used to indicate a resource for transmitting downlink data, the M resource areas are M of the N resource areas, the P resource areas are P of the N resource areas, M is a positive integer less than or equal to N, and P is a positive integer less than or equal to N.

In one embodiment, the downlink scheduling information further includes downlink data resource allocation information, the P resource areas include a first resource area and a second resource area, resources available for transmitting the downlink data in the first resource area and resources unavailable for transmitting the downlink data in the second resource area at least partially overlap, and the resource for transmitting the downlink data includes all or some resources available for transmitting the downlink data in the first resource area.

In one embodiment, resources indicated by the downlink data resource allocation information include some of the resources available for transmitting the downlink data in the first resource area, and the resource for transmitting the downlink data includes the some of the resources available for transmitting the downlink data in the first resource area.

In one embodiment, the P resource areas include a first resource area and a second resource area, resources available for transmitting the downlink data in the first resource area and resources unavailable for transmitting the downlink data in the second resource area at least partially overlap, and the resource for transmitting the downlink data does not include the resources unavailable for transmitting the downlink data in the second resource area.

In one embodiment, the first resource area and the second resource area are two resource areas that belong to the M resource areas; or the first resource area is a resource area that belongs to the M resource areas, and the second resource area is any resource area that does not belong to the M resource areas; or the first resource area is any resource area that does not belong to the M resource areas, and the second resource area is a resource area that belongs to the M resource areas; or the first resource area and the second resource area are any two resource areas that do not belong to the M resource areas.

In one embodiment, the resource indication information of the P resource areas includes P pieces of resource indication information, and the P pieces of resource indication information are in a one-to-one correspondence with the P resource areas; and the P pieces of resource indication information are respectively used to indicate a resource available for transmitting the downlink data or a resource unavailable for transmitting the downlink data in the P resource areas; or the P pieces of resource indication information are respectively used to indicate whether the P resource areas can be used to transmit the downlink data.

In one embodiment, the sending unit is further configured to send configuration information of the N resource areas to the terminal device, where the configuration information includes first start location information used to indicate a fourth resource area in the M resource areas, the first start location information indicates a start location of a search space at a first aggregation level, and the search space at the first aggregation level is located in the fourth resource area.

In one embodiment, the configuration information further includes second start location information of the fourth resource area in the M resource areas, the second start location information indicates a start location of a search space at a second aggregation level, the search space at the second aggregation level is located in the fourth resource area, and the second aggregation level is different from the first aggregation level.

In one embodiment, the configuration unit 1510 may be a processor 1620, the sending unit 1520 may be a transceiver 1640, and the network device may further include an input/output interface 1630 and a memory 1610. Details are shown in FIG. 16.

Figure 16:
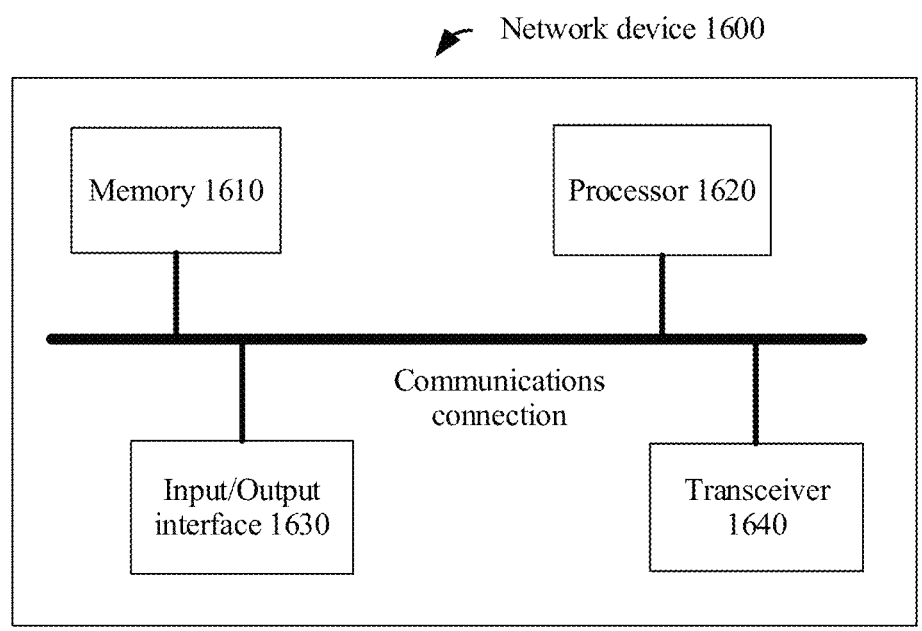
FIG. 16 is a schematic block diagram of a network device according to another embodiment of this application.

FIG. 16 is a schematic block diagram of a network device 1600 according to another embodiment of this application. The network device 1600 shown in FIG. 16 may include a memory 1610, a processor 1620, an input/output interface 1630, and a transceiver 1640. The memory 1610, the processor 1620, the input/output interface 1630, and the transceiver 1640 are connected by using internal connecting paths. The memory 1610 is configured to store an instruction. The processor 1620 is configured to execute the instruction stored in the memory 1610, to control the input/output interface 1630 to receive input data and information, or output data such as an operation result, and control the transceiver 1640 to send a signal.

The processor 1620 is configured to configure N resource areas for a terminal device, where N is a positive integer.

The transceiver 1640 is configured to send downlink scheduling information to the terminal device in M resource areas, where the downlink scheduling information includes resource indication information of P resource areas, the resource indication information of the P resource areas is used to indicate a resource for transmitting downlink data, the M resource areas are M of the N resource areas, the P resource areas are P of the N resource areas, M is a positive integer less than or equal to N, and P is a positive integer less than or equal to N.

It should be understood that, in this embodiment of this application, the processor 1620 may be a general-purpose central processing unit (CPU), a microprocessor, an application-specific integrated circuit (ASIC), or one or more integrated circuits, and is configured to execute a related program, to implement the technical solutions provided in this embodiment of this application.

It should be further understood that the transceiver 1640 is also referred to as a communications interface, and a transceiver apparatus, for example, but not limited to, a transceiver, is used to implement communication between the network device 1600 and another device or a communications network.

The memory 1610 may include a read-only memory and a random access memory, and provide an instruction and data for the processor 1620. A part of the memory 1610 may further include a nonvolatile random access memory. For example, the memory 1610 may further store device type information.

In an implementation process, the operations in the foregoing method can be implemented by using an integrated logic circuit of hardware in the processor 1620, or by using instructions in a form of software. The communication method disclosed with reference to the embodiments of this application may be directly performed by using a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 1610, and the processor 1620 reads information in the memory 1610 and completes the operations in the foregoing method in combination with hardware in the processor 1620. To avoid repetition, details are not described herein again.

It should be understood that, in this embodiment of this application, the processor may be a central processing unit (CPU), or the processor may be another general-purpose processor, a digital signal processor (DSP), an application-specific integrated circuit (ASIC), a field programmable gate array (FPGA) or another programmable logic device, a discrete gate, a transistor logic device, a discrete hardware component, or the like. The general-purpose processor may be a microprocessor, or the processor may be any conventional processor or the like.

It should be further understood that the memory in this embodiment of this application may be a volatile memory or a nonvolatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), and is used as an external cache. Through examples but not limitative description, many forms of random access memories (RAM) are available, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented by software, hardware, firmware, or any combination thereof. When software is used to implement the embodiments, all or some of the foregoing embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification means only an association relationship for describing associated objects and represents that three relationships may exist. For example, A and/or B may represent the following three cases: Only A exists, both A and B exist, and only B exists. In addition, the character "/" in this specification generally represents an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing described system, apparatus, and unit, reference may be made to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division and there may be another division manner during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit.

When the functions are implemented in the form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps in the methods described in the embodiments of this application. The storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
receiving, by a terminal device, configuration information of N resource areas, wherein the configuration information comprises first start location information used to indicate a fourth resource area in M resource areas of the N resource areas, the first start location information indicates a start location of a search space at a first aggregation level, and the search space at the first aggregation level is located in the fourth resource area;
detecting, by the terminal device, downlink scheduling information transmitted from a network device in the M resource areas, wherein the M resource areas comprise a first resource area and a third resource area, and wherein there is no search space in N-M resource areas, the downlink scheduling information is carried in one or more short physical downlink control channels (sPDCCH) in the M resource areas, and the downlink scheduling information comprises resource indication information of P resource areas comprising resource indication information of the first resource area and resource indication information of a second resource area, wherein the first resource area corresponds to the terminal device and the second resource area corresponds to another terminal device; and
determining, by the terminal device based on the resource indication information of the second resource area, a resource for transmitting downlink data from the network device to the terminal device, wherein N is a positive integer, the P resource areas are P of the N resource areas, M is a positive integer less than or equal to N, and P is a positive integer less than or equal to N.

2. The method according to claim 1, wherein the downlink scheduling information further comprises downlink data resource allocation information, the method further comprising:
determining, by the terminal device based on the resource indication information of the first resource area and the resource indication information of the second resource area, that resources available for transmitting the downlink data in the first resource area and resources unavailable for transmitting the downlink data in the second resource area at least partially overlap; and
wherein determining, by the terminal device based on the resource indication information of the P resource areas, a resource for transmitting downlink data from the network device comprises:
determining, by the terminal device based on the resource indication information of the P resource areas and the downlink data resource allocation information, the resource for transmitting the downlink data from the network device, wherein the resource for transmitting the downlink data from the network device comprises all or some of the resources available for transmitting the downlink data in the first resource area.

3. The method according to claim 2, wherein resources indicated by the downlink data resource allocation information comprise some of the resources available for transmitting the downlink data in the first resource area, and the resource for transmitting the downlink data comprises the some of the resources available for transmitting the downlink data in the first resource area.

4. The method according to claim 2, further comprising:
determining, by the terminal device based on the resource indication information of the first resource area and the resource indication information of the second resource area, that resources available for transmitting the downlink data in the first resource area and resources unavailable for transmitting the downlink data in the second resource area at least partially overlap; and
wherein determining, by the terminal device based on the resource indication information of the P resource areas, a resource for transmitting downlink data from the network device comprises:
determining, by the terminal device based on the resource indication information of the P resource areas and the downlink data resource allocation information, the resource for transmitting the downlink data from the network device, wherein the resource for transmitting the downlink data from the network device does not comprise the resources unavailable for transmitting the downlink data in the second resource area.

5. The method according to claim 2, wherein the first resource area and the second resource area comprise two resource areas that belong to the M resource areas; or
the first resource area comprises a resource area that belongs to the M resource areas, and the second resource area comprises a resource area that does not belong to the M resource areas; or
the first resource area comprises a resource area that does not belong to the M resource areas, and the second resource area comprises a resource area that belongs to the M resource areas; or
the first resource area and the second resource area comprise two resource areas that do not belong to the M resource areas.

6. The method according to claim 1, wherein the resource indication information of the P resource areas comprises P pieces of resource indication information, and the P pieces of resource indication information are in a one-to-one correspondence with the P resource areas; and
the P pieces of resource indication information are respectively used to indicate a resource available for transmitting the downlink data from the network device or a resource unavailable for transmitting the downlink data from the network device in the P resource areas; or the P pieces of resource indication information are respectively used to indicate whether the P resource areas can be used to transmit the downlink data from the network device.

7. A communication method, comprising:
configuring, by a network device, configuration information of N resource areas for a terminal device, wherein the configuration information comprises first start location information used to indicate a fourth resource area in M resource areas of the N resource areas, the first start location information indicates a start location of a search space at a first aggregation level, and the search space at the first aggregation level is located in the fourth resource area, wherein N is a positive integer; and
sending, by the network device, downlink scheduling information to the terminal device in the M resource areas, wherein the M resource areas comprise a first resource area and a third resource area, and wherein there is no search space in N-M resource areas, the downlink scheduling information is carried in one or more short physical downlink control channel (sPDCCH) in the M resource areas, and the downlink scheduling information comprises resource indication information of P resource areas comprising resource indication information of the first resource area and resource indication information of a second resource area, wherein the first resource area corresponds to the terminal device and the second resource area corresponds to another terminal device, and
wherein the resource indication information of the second resource area is used to indicate a resource for transmitting downlink data from the network device to the terminal device, wherein N is a positive integer, the P resource areas are P of the N resource areas, M is a positive integer less than or equal to N, and P is a positive integer less than or equal to N.

8. The method according to claim 7, wherein the downlink scheduling information further comprises downlink data resource allocation information, wherein resources available for transmitting the downlink data in the first resource area and resources unavailable for transmitting the downlink data in the second resource area at least partially overlap, and wherein the resource for transmitting the downlink data comprises all or some of the resources available for transmitting the downlink data in the first resource area.

9. The method according to claim 8, wherein resources indicated by the downlink data resource allocation information comprise some of the resources available for transmitting the downlink data in the first resource area, and the resource for transmitting the downlink data comprises the some of the resources available for transmitting the downlink data in the first resource area.

10. The method according to claim 7, wherein resources available for transmitting the downlink data in the first resource area and resources unavailable for transmitting the downlink data in the second resource area at least partially overlap, and wherein the resource for transmitting the downlink data does not comprise the resources unavailable for transmitting the downlink data in the second resource area.

11. A terminal device, comprising:
a receiving unit, configured to receive configuration information of N resource areas, wherein the configuration information comprises first start location information used to indicate a fourth resource area in M resource areas of the N resource areas, the first start location information indicates a start location of a search space at a first aggregation level, and the search space at the first aggregation level is located in the fourth resource area;
a detection unit, configured to detect downlink scheduling information transmitted from a network device in in the M resource areas, wherein the M resource areas comprise a first resource area and a third resource area, and wherein there is no search space in N-M resource areas, the downlink scheduling information is carried in one or more short physical downlink control channels (sPDCCH) in the M resource areas, and the downlink scheduling information comprises resource indication information of P resource areas comprising resource indication information of the first resource area and resource indication information of a second resource area, wherein the first resource area corresponds to the terminal device and the second resource area corresponds to another terminal device; and
a determining unit, configured to determine, based on the resource indication information of the second resource area, a resource for transmitting downlink data from the network device to the terminal device, wherein N is a positive integer, the P resource areas are P of the N resource areas, M is a positive integer less than or equal to N, and P is a positive integer less than or equal to N.

12. The terminal device according to claim 11, wherein the downlink scheduling information further comprises downlink data resource allocation information, and the determining unit is further configured to:
determine, based on the resource indication information of the first resource area and the resource indication information of the second resource area, that resources available for transmitting the downlink data in the first resource area and resources unavailable for transmitting the downlink data in the second resource area at least partially overlap; and
determine, based on the resource indication information of the P resource areas and the downlink data resource allocation information, the resource for transmitting the downlink data from the network device, wherein the resource for transmitting the downlink data from the network device comprises all or some of the resources available for transmitting the downlink data in the first resource area.

13. The terminal device according to claim 12, wherein resources indicated by the downlink data resource allocation information comprise some of the resources available for transmitting the downlink data in the first resource area, and the resource for transmitting the downlink data comprises the some of the resources available for transmitting the downlink data in the first resource area.

14. The terminal device according to claim 12, wherein the determining unit is further configured to:
determine, based on the resource indication information of the first resource area and the resource indication information of the second resource area, that resources available for transmitting the downlink data in the first resource area and resources unavailable for transmitting the downlink data in the second resource area at least partially overlap; and
determine, based on the resource indication information of the P resource areas and the downlink data resource allocation information, the resource for transmitting the downlink data from the network device, wherein the resource for transmitting the downlink data from the network device does not comprise the resources unavailable for transmitting the downlink data in the second resource area.

15. The terminal device according to claim 12, wherein the first resource area and the second resource area comprise two resource areas that belong to the M resource areas; or
the first resource area comprises a resource area that belongs to the M resource areas, and the second resource area comprises a resource area that does not belong to the M resource areas; or
the first resource area comprises a resource area that does not belong to the M resource areas, and the second resource area comprises a resource area that belongs to the M resource areas; or
the first resource area and the second resource area comprise two resource areas that do not belong to the M resource areas.

16. The terminal device according to claim 11, wherein the resource indication information of the P resource areas comprises P pieces of resource indication information, and the P pieces of resource indication information are in a one-to-one correspondence with the P resource areas; and
the P pieces of resource indication information are respectively used to indicate a resource available for transmitting the downlink data from the network device or a resource unavailable for transmitting the downlink data from the network device in the P resource areas; or
the P pieces of resource indication information are respectively used to indicate whether the P resource areas can be used to transmit the downlink data from the network device.

17. A network device, comprising:
a configuration unit, configured to configure configuration information of N resource areas for a terminal device, wherein the configuration information comprises first start location information used to indicate a fourth resource area in M resource areas of the N resource areas, the first start location information indicates a start location of a search space at a first aggregation level, and the search space at the first aggregation level is located in the fourth resource area, wherein N is a positive integer; and
a sending unit, configured to send downlink scheduling information to the terminal device in the M resource areas, wherein the M resource areas comprise a first resource area and a third resource area, and wherein there is no search space in N-M resource areas, the downlink scheduling information is carried in one or more short physical downlink control channel (sPDCCH) in the M resource areas, and the downlink scheduling information comprises resource indication information of P resource areas comprising resource indication information of the first resource area and resource indication information of a second resource area, wherein the first resource area corresponds to the terminal device and the second resource area corresponds to another terminal device, and
wherein the resource indication information of the second resource area is used to indicate a resource for transmitting downlink data from the network device to the terminal device, wherein N is a positive integer, the P resource areas are P of the N resource areas, M is a positive integer less than or equal to N, and P is a positive integer less than or equal to N.

18. The network device according to claim 17, wherein the downlink scheduling information further comprises downlink data resource allocation information, wherein resources available for transmitting the downlink data in the first resource area and resources unavailable for transmitting the downlink data in the second resource area at least partially overlap, and wherein the resource for transmitting the downlink data comprises all or some of the resources available for transmitting the downlink data in the first resource area.

19. The network device according to claim 18, wherein resources indicated by the downlink data resource allocation information comprise some of the resources available for transmitting the downlink data in the first resource area, and the resource for transmitting the downlink data comprises the some of the resources available for transmitting the downlink data in the first resource area.

20. The network device according to claim 17, wherein resources available for transmitting the downlink data in the first resource area and resources unavailable for transmitting the downlink data in the second resource area at least partially overlap, and wherein the resource for transmitting the downlink data does not comprise the resources unavailable for transmitting the downlink data in the second resource area.

* * * * *